(12) United States Patent
Dai et al.

(10) Patent No.: US 12,135,409 B2
(45) Date of Patent: Nov. 5, 2024

(54) OPTICAL IMAGING LENS GROUP

(71) Applicant: Zhejiang Sunny Optical Co., Ltd, Ningbo (CN)

(72) Inventors: Fujian Dai, Ningbo (CN); Kaiyuan Zhang, Ningbo (CN); Biao Xu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 1039 days.

(21) Appl. No.: 17/031,234

(22) Filed: Sep. 24, 2020

(65) Prior Publication Data

US 2021/0003829 A1    Jan. 7, 2021

Related U.S. Application Data

(63) Continuation of application No. PCT/CN2019/099017, filed on Aug. 2, 2019.

(30) Foreign Application Priority Data

Oct. 29, 2018 (CN) .......................... 201811268632.0

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/18; G02B 13/005; G03B 30/00
USPC ....................................................... 359/755
See application file for complete search history.

(56) References Cited

U.S. PATENT DOCUMENTS 10,012,818 B2 *   7/2018   Tang ...................... G02B 13/06
2017/0357081 A1   12/2017  Dai et al.

FOREIGN PATENT DOCUMENTS

| CN | 103529539   | 1/2014 |
| CN | 204832662 U | 12/2015 |
| CN | 105301746 A | 2/2016 |
| CN | 105988199 A | 10/2016 |
| CN | 106154513 A | 11/2016 |
| CN | 106483629 A | 3/2017 |
| CN | 107621683   | 1/2018 |
| CN | 107643586   | 1/2018 |
| CN | 107817581 A | 3/2018 |

(Continued)

*Primary Examiner* — Henry Duong
(74) *Attorney, Agent, or Firm* — HAUPTMAN HAM, LLP

(57) ABSTRACT

An optical imaging lens group includes a first lens through a seventh lens sequentially arranged from an object side to an image side along an optical axis. The first lens has positive refractive power, and object-side and image-side surfaces thereof are a convex surface and a concave surface, respectively. The second lens has negative refractive power, and object-side and image-side surfaces of the second lens are a convex surface and a concave surface, respectively. The fourth and fifth lenses both have refractive power. The third and sixth lenses both have positive refractive power. The seventh lens has negative refractive power, and an object-side surface thereof has a concave surface. A distance along the optical axis TTL from the object-side surface of the first lens to an imaging plane and half of a diagonal length ImgH of an effective pixel area on the imaging plane satisfy TTL/ImgH<1.3.

19 Claims, 11 Drawing Sheets

(56) References Cited

FOREIGN PATENT DOCUMENTS

| | | |
|---|---|---|
| CN | 108107546 | 6/2018 |
| CN | 108535848 | 9/2018 |
| CN | 109031628 A | 12/2018 |
| CN | 209044156 U | 6/2019 |
| JP | 6360958 B1 | 7/2018 |

* cited by examiner

OPTICAL IMAGING LENS GROUP

CROSS-REFERENCE TO RELATED APPLICATION

The present patent application is a continuation of International Application No. PCT/CN2019/099017, filed on Aug. 2, 2019, which claims priority to Chinese Patent Application No. 201811268632.0, filed before the China National Intellectual Property Administration (CNIPA) on Oct. 29, 2018. Both of the aforementioned patent applications are hereby incorporated by reference in their entireties.

TECHNICAL FIELD

The present disclosure relates to an optical imaging lens group, and more specifically, relates to an optical imaging lens group including seven lenses.

BACKGROUND

Recently, the requirement for an imaging lens assembly applicable to a mobile terminal product, such as a telephone, has been increasingly stringent in the market. In order to comply with the development trend of an ultra-thin electronic product, the lens assembly amounted therein is desired to be as slim and small as possible. At the same time, with the improvement of the image sensor performance and the reduction in its size, the design freedom of the corresponding lens assembly is getting smaller increasingly, and the design difficulty is increasing gradually.

Meanwhile, a higher requirement have been proposed for imaging effect of the imaging lens assembly mounted in the portable electronic product while the market is gradually developing. It is desired that an optical lens assembly in a handheld camera may have characteristics of large aperture and high imaging quality, in order to ensure that the handheld camera may achieve a small depth of field, and capture a final image with virtual portion and real portion, thereby capturing clear images in a dark environment.

SUMMARY

The present disclosure provides an optical imaging lens group that is applicable to portable electronic products and at least solves or partially addresses at least one of the above disadvantages of the prior art.

In an aspect, the present disclosure provides an optical imaging lens group that includes a first lens, a second lens, a third lens, a fourth lens, a fifth lens, a sixth lens and a seventh lens, which are sequentially arranged from an object side to an image side of the optical imaging lens group along an optical axis. The first lens may have positive refractive power, an object-side surface of the first lens may be a convex surface, and an image-side surface of the first lens may be a concave surface. The second lens may have negative refractive power, an object-side surface of the second lens may be a convex surface, and an image-side surface of the second lens may be a concave surface. The third lens may have positive refractive power. The fourth lens has refractive power. The fifth lens has refractive power. The sixth lens may have positive refractive power. The seventh lens may have negative refractive power, and an object-side surface of the seventh lens may be a concave surface.

In one embodiment, a distance along the optical axis TTL from the object-side surface of the first lens to an imaging plane of the optical imaging lens group and half of a diagonal length ImgH of an effective pixel area on the imaging plane of the optical imaging lens group may satisfy TTL/ImgH<1.3.

In one embodiment, a center thickness CT1 of the first lens along the optical axis, a center thickness CT2 of the second lens along the optical axis, and a spaced interval T12 between the first lens and the second lens along the optical axis may satisfy $4 \leq (CT1+CT2)/(T12\times 5)<5.5$.

In one embodiment, a radius of curvature R1 of the object-side surface of the first lens, and a radius of curvature R2 of the image-side surface of the first lens may satisfy $-2.5<(R1+R2)/(R1-R2)<-1.5$.

In one embodiment, a total effective focal length f of the optical imaging lens group, an effective focal length f1 of the first lens, and an effective focal length f2 of the second lens may satisfy $1.0<f/f1-f/f2<1.5$.

In one embodiment, an edge thickness ET5 of the fifth lens, and a center thickness CT5 of the fifth lens along the optical axis may satisfy $0.5<ET5/CT5 \leq 1.5$.

In one embodiment, a distance SAG51 along the optical axis from an intersection of an object-side surface of the fifth lens and the optical axis to a vertex of an effective radius of the object-side surface of the fifth lens, and a distance SAG41 along the optical axis from an intersection of an object-side surface of the fourth lens and the optical axis to a vertex of an effective radius of the object-side surface of the fourth lens may satisfy $2<SAG51/SAG41 \leq 3$.

In one embodiment, an edge thickness ET6 of the sixth lens and an edge thickness ET7 of the seventh lens may satisfy $0.5<ET6/ET7<2.5$.

In one embodiment, a radius of curvature R13 of the object-side surface of the seventh lens, and a radius of curvature of R14 an image-side surface of the seventh lens may satisfy $-0.1<R13/R14 \leq -0.5$.

In one embodiment, a total effective focal length f of the optical imaging lens group and a center thickness CT3 of the third lens along the optical axis may satisfy $8.0<f/CT3<12$.

In one embodiment, an effective focal length f3 of the third lens and a radius of curvature R3 of the object-side surface of the second lens may satisfy $1<f3/R3<3$.

In one embodiment, a combined focal length f345 of the third lens, the fourth lens, and the fifth lens, and a combined focal length f67 of the sixth lens and the seventh lens may satisfy $-3.5<f345/f67<-1.5$.

In one embodiment, a sum of spaced interval along the optical axis $\Sigma AT$ between each two adjacent lenses among the first lens to the seventh lens, and a spaced interval T67 between the sixth lens and the seventh lens along the optical axis may satisfy $3.5<\Sigma AT/T67<5$.

In one embodiment, a total effective focal length f of the optical imaging lens group and an entrance pupil diameter EPD of the optical imaging lens group may satisfy f/EPD<2.1.

The present disclosure employs seven lenses, and the above optical imaging lens group has at least one advantages such as ultra-thin, large aperture, and high image quality and the like by properly configuring the refractive power of each lens, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
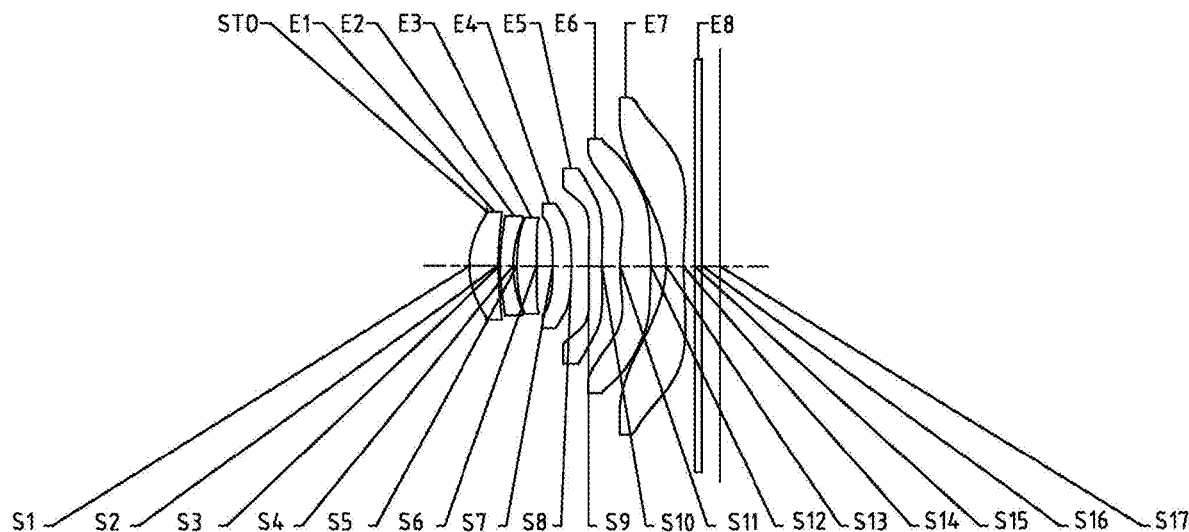
FIG. 1 is a schematic structural view of an optical imaging lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

An optical imaging lens group according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power, an object-side surface thereof may be a convex surface and an image-side surface thereof may be a concave surface. The second lens may have negative refractive power, an object-side surface thereof may be a convex surface, and an image-side surface thereof may be a concave surface. The third lens may have positive refractive power. The fourth lens has positive refractive power or negative refractive power. The fifth lens has positive refractive power or negative refractive power. The sixth lens may have positive refractive power. The seventh lens may have negative refractive power, and an object-side surface thereof may be a concave surface. By properly configuring the refractive power and surface shape of the first and second lenses, it is possible for the imaging system to possess a respective smaller longitudinal aberration. In addition, by properly configuring refractive power of the third through seventh lenses and the surface shape of the seventh lens, the aberrations for high-order of the imaging system may be effectively compensated and it is beneficial for the system to match a chief ray thereof with an imaging area.

In an exemplary embodiment, an object-side surface of the third lens may be a convex surface.

In an exemplary embodiment, an object-side surface of the fourth lens may be a concave surface.

In an exemplary embodiment, each of an object-side surface and an image-side surface of the sixth lens may be a convex surface.

In an exemplary embodiment, an image-side surface of the seventh lens may be a concave surface.

In an exemplary embodiment, the optical imaging lens group according to the present disclosure may satisfy: $4 \leq (CT1+CT2)/(T12 \times 5) < 5.5$, where CT1 is a center thickness of the first lens along the optical axis, CT2 is a center thickness of the second lens along the optical axis, and T12 is a spaced interval between the first lens and the second lens along the optical axis. More specifically, CT1, CT2 and T12 may further satisfy: $4.00 \leq (CT1+CT2)/(T12 \times 5) \leq 5.32$. By controlling the center thicknesses of the first and second lenses along the optical axis and the spaced interval between the first lens and the second lens along the optical axis, it is possible for the imaging system to have a smaller field curvature.

In an exemplary embodiment, the optical imaging lens group according to the present disclosure may satisfy: TTL/ImgH<1.3, where TTL is a distance along the optical axis from an object-side surface of the first lens to an imaging plane of the optical imaging lens group, and ImgH is half of a diagonal length of an effective pixel area on the imaging plane of the optical imaging lens group. More specifically, TTL and ImgH may further satisfy: $1.1 <$TTL/ImgH$<1.25$, for example, $1.19 \leq$TTL/ImgH$\leq 1.21$. By controlling a ratio of the total length of the imaging system to the image height thereof, it is possible for the system to have an ultra-thin property.

In an exemplary embodiment, the optical imaging lens group according to the present disclosure may satisfy: $0.5 <$ET5/CT5$\leq 1.5$, where ET5 is an edge thickness of the fifth lens, and CT5 is a center thickness of the fifth lens along the optical axis. More specifically, ET5 and CT5 may further satisfy: $0.84 \leq$ET5/CT5$\leq 1.19$. By controlling a ratio of the edge thickness of the fifth lens to the center thickness thereof, it is possible to ensure to have a good processability for the lens.

In an exemplary embodiment, the optical imaging lens group according to the present disclosure may satisfy: $-3.5 <$f345/f67$<-1.5$, where f345 is a combined focal length of the third lens, the fourth lens, and the fifth lens, and f67 is a combined focal length of the sixth lens and the seventh lens. More specifically, f345 and f67 may further satisfy: $-3.37 \leq$f345/f67$\leq -1.85$. By controlling a ratio of the combined focal length of the third, fourth and fifth lenses to the combined focal length of the sixth and seventh lenses to be within a certain range, it is possible to reduce aberrations at the edge field of view.

In an exemplary embodiment, the optical imaging lens group according to the present disclosure may satisfy: $2 <$SAG51/SAG41$\leq 3$, where SAG51 is a distance along the optical axis from an intersection of an object-side surface of the fifth lens and the optical axis to a vertex of an effective radius of the object-side surface of the fifth lens, and SAG41 is a distance along the optical axis from an intersection of an object-side surface of the fourth lens and the optical axis to a vertex of an effective radius of the object-side surface of the fourth lens. More specifically, SAG51 and SAG41 may further satisfy: $2.14 \leq$SAG51/SAG41$\leq 2.77$. By satisfying the conditional expression $2 <$SAG51/SAG41$\leq 3$, it is possible to effectively reduce an incident angle of the chief ray on the object-side surfaces of the fourth and fifth lenses, and it is possible to improve a match degree of the imaging lens assembly with the chip.

In an exemplary embodiment, the optical imaging lens group according to the present disclosure may satisfy: $0.5 <$ET6/ET7$<2.5$, where ET6 is an edge thickness of the sixth lens, and ET7 is an edge thickness of the seventh lens. More specifically, ET6 and ET7 may further satisfy: $0.82 \leq$ET6/ET7$\leq 2.43$. By controlling a ratio of the edge thickness of the sixth lens to the edge thickness of the seventh lens, it is possible to effectively compress the size of the imaging system, and it is possible to ensure that the optical elements therein have good processabilities.

In an exemplary embodiment, the optical imaging lens group according to the present disclosure may satisfy: $-2.5 <(R1+R2)/(R1-R2)<-1.5$, where R1 is a radius of curvature of an object-side surface of the first lens, and R2 is a radius of curvature of an image-side surface of the first lens. More specifically, R1 and R2 may further satisfy: $-2.3 \leq (R1+R2)/(R1-R2) \leq -1.8$, for example, $-2.17 \leq (R1+R2)/(R1-R2) \leq -1.94$. By restricting the radius of curvature of the object-side surface and the radius of curvature of the image-side surface of the first lens, it is possible to effectively control a refraction angle of light beam at first lens in the imaging system, and it is possible for the system to possess a good processability.

In an exemplary embodiment, the optical imaging lens group according to the present disclosure may satisfy: $-0.1<R13/R14\le-0.5$, where R13 is a radius of curvature of an object-side surface of the seventh lens, and R14 is a radius of curvature of an image-side surface of the seventh lens. More specifically, R13 and R14 may further satisfy: $-0.69\le R13/R14\le-0.49$. By controlling the radius of curvature of the object-side surface and the radius of curvature of the image-side surface of the seventh lens, it is possible to control the light ray angle at the edge field of view to be within a proper range, and to effectively reduce the sensitivity of the entire imaging system.

In an exemplary embodiment, the optical imaging lens group according to the present disclosure may satisfy: $3.5<\Sigma AT/T67<5$, where $\Sigma AT$ is a sum of spaced interval along the optical axis between each two adjacent lenses among the first lens to the seventh lens, and T67 is a spaced interval between the sixth lens and the seventh lens along the optical axis. More specifically, $\Sigma AT$ and T67 may further satisfy: $3.65\le\Sigma AT/T67\le4.81$. By restricting a ratio of $\Sigma AT$ to T67, it is possible to properly control distortions of the imaging system, and thus the system possesses a good performance in distortion.

In an exemplary embodiment, the optical imaging lens group according to the present disclosure may satisfy: $1.0<f/f1-f/f2<1.5$, where f is a total effective focal length of the optical imaging lens group, f1 is an effective focal length of the first lens, and f2 is an effective focal length of the second lens. More specifically, f, f1 and f2 may further satisfy: $1.26\le f/f1-f/f2\le1.46$. By properly controlling refractive power of the first and second lenses, it is possible to provide properly a negative spherical aberration for fifth order and a positive spherical aberration for third order, which may compensate a positive spherical aberration for fifth order and a negative spherical aberration for third order produced by the subsequent optical elements. Thus, the imaging system may possess a smaller spherical aberration, and have a good imaging quality at axial field of view.

In an exemplary embodiment, the optical imaging lens group according to the present disclosure may satisfy: $8.0<f/CT3<12$, where f is a total effective focal length of the optical imaging lens group, and CT3 is a center thickness of the third lens along the optical axis. More specifically, f and CT3 may further satisfy: $8.82\le f/CT3\le11.28$. By constraining a ratio of total effective focal length to the center thickness of the third lens, it is possible to properly control the contribution degree of the third lens on comatic aberrations for the whole system, and thus to compensate the comatic aberrations produced by prior optical elements. Therefore, a good imaging quality may be obtained.

In an exemplary embodiment, the optical imaging lens group according to the present disclosure may satisfy: $1<f3/R3<3$, where f3 is an effective focal length of the third lens, and R3 is a radius of curvature of an object-side surface of the second lens. More specifically, f3 and R3 may further satisfy: $1.90\le f3/R3\le2.84$. By controlling a ratio of the effective focal length of the third lens to the radius of curvature of an object-side surface of the second lens within a certain range, it is possible to control a deflection angle of the edge field of view at the third lens, and thus to effectively reduce the sensitivity of the entire imaging system.

In an exemplary embodiment, the optical imaging lens group according to the present disclosure may satisfy: $f/EPD<2.1$, where f is a total effective focal length of the optical imaging lens group, and EPD is an entrance pupil diameter of the optical imaging lens group. More specifically, f and EPD may further satisfy: $2.04\le f/EPD\le2.06$. By satisfying the conditional expression $f/EPD<2.1$, it is possible for the lens assembly to possess a larger aperture, and thus to increase the amount of the light passing through the imaging system per unit time, which may enhance the imaging effect in a dark environment. Meanwhile, it is further possible to reduce aberrations at the edge field of view.

In an exemplary embodiment, the above-mentioned optical imaging lens group may further include a stop to improve the imaging quality of the lens group. Alternatively, the stop may be provided between the object side and the first lens. Alternatively, the above-mentioned optical imaging lens group may further include a filter for correcting the color deviation and/or a protective glass for protecting the photosensitive element located on an imaging plane.

The optical imaging lens group according to the above-mentioned embodiment of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the lens group may be effectively reduced, and the workability of the lens assembly may be improved, such that the optical imaging lens group is more advantageous for production processing and may be applied to portable electronic products. The optical imaging lens group configured as described above may also have the characteristics of ultra-thin, large aperture, high imaging quality, and the like.

In the embodiment of the present disclosure, at least one of the surfaces of each lens is aspheric. That is, at least one of the object-side surface and the image-side surface of each lens among the first lens, the second lens, the third lens, the fourth lens, the fifth lens, the sixth lens, and the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Alternatively, the object-side surface and the image-side surface of each lens among the first lens, the second lens, the third lens, the fourth lens, the fifth lens, the sixth lens, and the seventh lens both are aspheric.

However, it will be understood by those skilled in the art that the number of lenses constituting the optical imaging lens group may be varied to achieve the various results and advantages described in this specification without departing from the technical solution claimed by the present disclosure. For example, although the example is described by taking seven lenses as an example, the optical imaging lens group is not limited to include seven lenses. The optical imaging lens group may also include other numbers of lenses if desired. Some specific examples of an optical imaging lens group applicable to the above-mentioned embodiment will be further described below with reference to the accompanying drawings.

Example 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 shows surface type, radius of curvature, thickness, material and conic coefficient of each lens of the optical imaging lens group in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2812 | | | |
| S1 | Aspheric | 1.3530 | 0.4548 | 1.55 | 56.1 | 0.0000 |
| S2 | Aspheric | 4.2428 | 0.0300 | | | 0.0000 |
| S3 | Aspheric | 2.6908 | 0.2100 | 1.67 | 20.4 | 0.0000 |
| S4 | Aspheric | 1.7321 | 0.0609 | | | 0.0000 |
| S5 | Aspheric | 4.0275 | 0.3115 | 1.55 | 56.1 | 0.0000 |
| S6 | Aspheric | 115.4749 | 0.2588 | | | 0.0000 |
| S7 | Aspheric | −5.4637 | 0.2958 | 1.62 | 25.9 | 9.7559 |
| S8 | Aspheric | −6.7800 | 0.2704 | | | −41.1815 |
| S9 | Aspheric | 8.6547 | 0.2100 | 1.64 | 24 | 0.4905 |
| S10 | Aspheric | 8.5325 | 0.2886 | | | −98.9966 |
| S11 | Aspheric | 3.4589 | 0.4900 | 1.55 | 56.1 | −58.8604 |
| S12 | Aspheric | −3.6565 | 0.2435 | | | 0.8711 |
| S13 | Aspheric | −1.4128 | 0.2703 | 1.55 | 56.1 | −1.3239 |
| S14 | Aspheric | 2.8757 | 0.1853 | | | −83.9130 |
| S15 | Spherical | Infinite | 0.1100 | 1.52 | 64.2 | |
| S16 | Spherical | Infinite | 0.2900 | | | |
| S17 | Spherical | Infinite | | | | |

As can be seen from Table 1, the object-side surface and the image-side surface of any one of the first lens E1 to the seventh lens E7 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 |
|---|---|---|---|---|---|
| S1 | −1.2070E−02 | 5.6591E−02 | −3.2462E−01 | 7.9616E−01 | −1.1043E+00 |
| S2 | −1.4122E−01 | 2.6758E−01 | 3.7904E−01 | −3.4536E+00 | 8.0526E+00 |
| S3 | −2.1059E−01 | 3.2252E−01 | 1.9610E−01 | −2.7383E+00 | 6.8149E+00 |
| S4 | −4.3292E−02 | 1.5149E−03 | 1.0988E+00 | −6.8587E+00 | 2.6626E+01 |
| S5 | 1.1628E−01 | −1.1389E−01 | 2.0755E+00 | −1.2265E+01 | 4.8578E+01 |
| S6 | 3.5999E−02 | −8.9108E−02 | 1.2123E+00 | −6.7042E+00 | 2.6077E+01 |
| S7 | −1.6146E−01 | 1.7586E−01 | −4.3874E+00 | 3.0730E+01 | −1.2629E+02 |
| S8 | −1.5578E−01 | 9.4562E−02 | −1.9289E+00 | 9.2501E+00 | −2.5765E+01 |
| S9 | −4.2124E−02 | −1.9411E−01 | 3.5746E−04 | 1.4254E+00 | −4.5201E+00 |
| S10 | −3.0068E−02 | −5.3421E−01 | 1.5622E+00 | −2.3968E+00 | 2.0655E+00 |
| S11 | 2.0408E−01 | −8.4572E−01 | 9.0363E−01 | −5.0905E−01 | 1.5011E−01 |
| S12 | 4.7403E−01 | −9.1058E−01 | 8.0467E−01 | −4.1906E−01 | 1.4019E−01 |
| S13 | 1.5538E−01 | −1.3544E−01 | 6.0216E−02 | −8.8438E−03 | −2.3063E−03 |
| S14 | −1.1969E−01 | 1.4063E−01 | −9.8387E−02 | 4.1029E−02 | −1.1250E−02 |

| Surface number | A14 | A16 | A18 | A20 |
|---|---|---|---|---|
| S1 | 6.3503E−01 | 2.0444E−02 | −1.4750E−01 | 0.0000E+00 |
| S2 | −8.6630E+00 | 3.5849E+00 | 0.0000E+00 | 0.0000E+00 |
| S3 | −7.5111E+00 | 3.1532E+00 | 0.0000E+00 | 0.0000E+00 |
| S4 | −7.2031E+01 | 1.2827E+02 | −1.3150E+02 | 5.6810E+01 |
| S5 | −1.2705E+02 | 2.1020E+02 | −1.9663E+02 | 7.8121E+01 |
| S6 | −6.5154E+01 | 1.0107E+02 | −8.7252E+01 | 3.2874E+01 |
| S7 | 3.1604E+02 | −4.7714E+02 | 3.9841E+02 | −1.4116E+02 |
| S8 | 4.3844E+01 | −4.4822E+01 | 2.5216E+01 | −5.9260E+00 |
| S9 | 6.3952E+00 | −4.8653E+00 | 1.9411E+00 | −3.1665E−01 |
| S10 | −1.0352E+00 | 3.0116E−01 | −4.7355E−02 | 3.1211E−03 |
| S11 | −1.1421E−02 | −5.9508E−03 | 1.7112E−03 | −1.3960E−04 |
| S12 | −3.1483E−02 | 4.8348E−03 | −4.8594E−04 | 2.4657E−05 |
| S13 | 1.2099E−03 | −2.1666E−04 | 1.8505E−05 | −6.3279E−07 |
| S14 | 2.0599E−03 | −2.4151E−04 | 1.6331E−05 | −4.8293E−07 |

Table 3 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 1.

TABLE 3

| | |
|---|---|
| f1(mm) | 3.45 |
| f2(mm) | −8.00 |
| f3(mm) | 7.64 |
| f4(mm) | −49.72 |
| f5(mm) | −2871.27 |
| f6(mm) | 3.34 |
| f7(mm) | −1.70 |
| f(mm) | 3.51 |
| TTL(mm) | 3.98 |
| ImgH(mm) | 3.35 |
| Semi-FOV(°) | 35.0 |

Figure 2A:
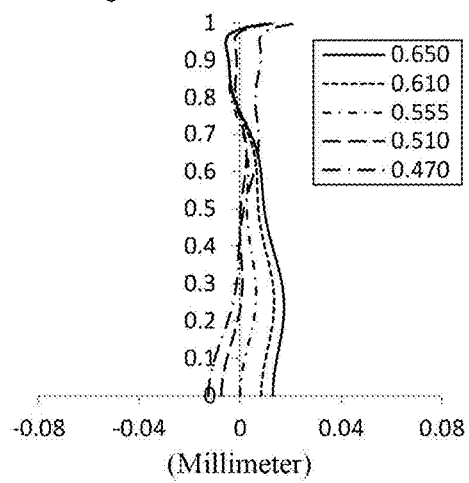
FIGS. 2A-2D illustrate a longitudinal aberration curve, an astigmatic curve, a distortion curve and a lateral color curve of the optical imaging lens group according to example 1, respectively.
Figure 2B:
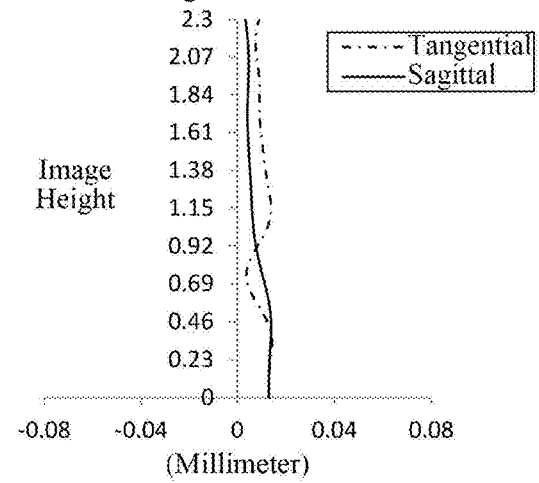
Figure 2C:
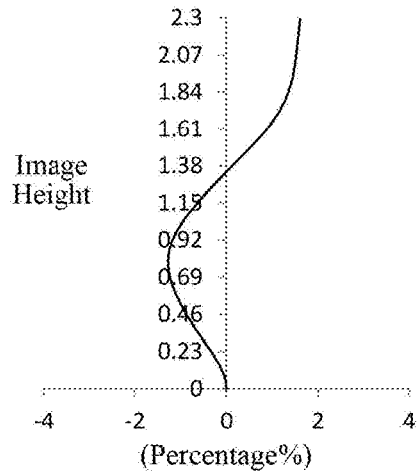
Figure 2D:
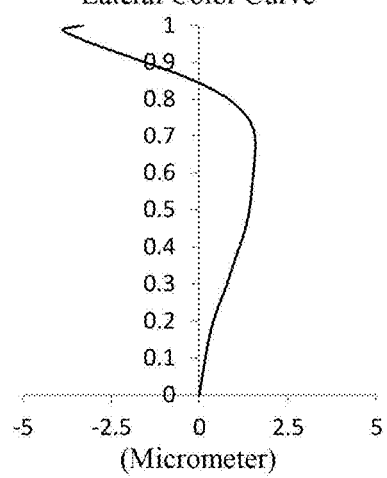

FIG. 2A illustrates a longitudinal aberration curve of the optical imaging lens group according to example 1, representing deviations of focal points focused by light of different wavelengths after passing through the optical imaging lens group. FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion corresponding to different image heights. FIG. 2D illustrates a lateral color curve of the optical imaging lens group according to example 1, representing deviations of different image heights on an imaging plane after the light passes through the optical imaging lens group. It can be seen from FIG. 2A to FIG. 2D that the optical imaging lens group provided in example 1 can achieve good image quality.

Example 2

Figure 3:
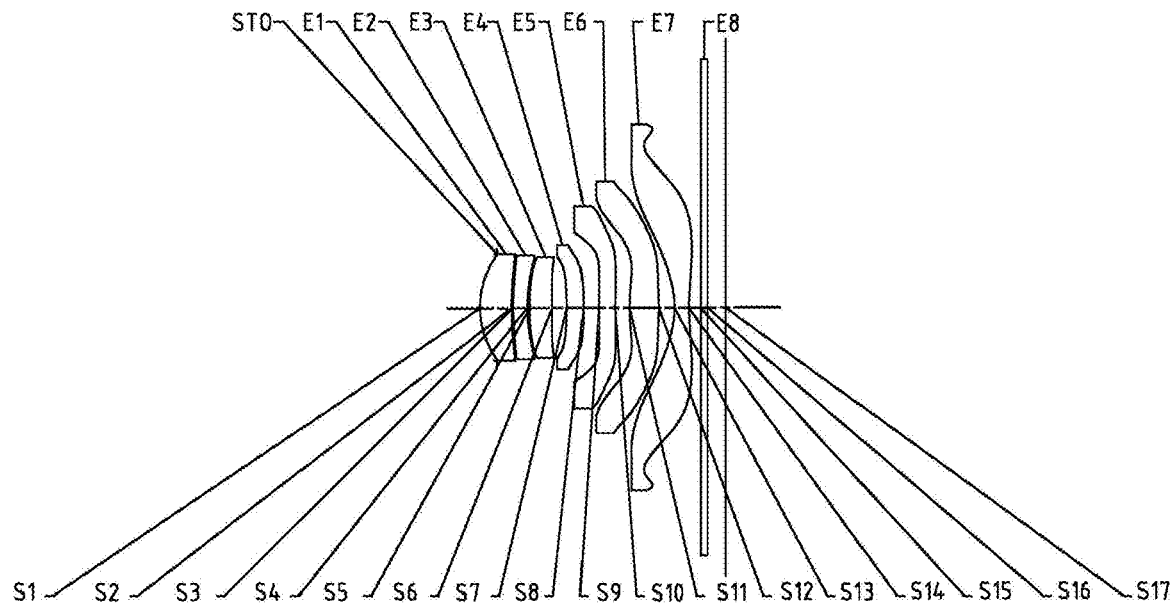
FIG. 3 is a schematic structural view of an optical imaging lens group according to example 2 of the present disclosure.

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has positive refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 4 shows surface type, radius of curvature, thickness, material and conic coefficient of each lens of the optical imaging lens group in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOX in example 2.

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2813 | | | |
| S1 | Aspheric | 1.3650 | 0.5117 | 1.55 | 56.1 | 0.0000 |
| S2 | Aspheric | 4.2549 | 0.0295 | | | 0.0000 |
| S3 | Aspheric | 4.8026 | 0.2300 | 1.67 | 20.4 | 0.0000 |
| S4 | Aspheric | 2.9272 | 0.0355 | | | 0.0000 |
| S5 | Aspheric | 5.5193 | 0.3667 | 1.55 | 56.1 | 0.0000 |
| S6 | Aspheric | 182.3545 | 0.2360 | | | 0.0000 |
| S7 | Aspheric | −8.4321 | 0.2674 | 1.62 | 25.9 | −2.7295 |
| S8 | Aspheric | −8.4569 | 0.2481 | | | −9.1518 |
| S9 | Aspheric | 12.6250 | 0.2617 | 1.64 | 24 | 17.7595 |
| S10 | Aspheric | 8.4139 | 0.2341 | | | −3.8255 |
| S11 | Aspheric | 3.3650 | 0.4734 | 1.55 | 56.1 | −99.0000 |
| S12 | Aspheric | −3.6631 | 0.2562 | | | 0.7224 |
| S13 | Aspheric | −1.4404 | 0.2300 | 1.55 | 56.1 | −1.3281 |
| S14 | Aspheric | 2.1620 | 0.1925 | | | −64.6096 |
| S15 | Spherical | Infinite | 0.1100 | 1.52 | 64.2 | |
| S16 | Spherical | Infinite | 0.2972 | | | |
| S17 | Spherical | Infinite | | | | |

TABLE 5

| Surface number | A4 | A6 | A8 | A10 | A12 |
|---|---|---|---|---|---|
| S1 | −3.2801E−02 | 7.4325E−03 | 7.1614E−01 | −3.8047E+00 | 7.4777E+00 |
| S2 | 2.2268E−01 | −3.3597E+00 | 1.6883E+01 | −4.4062E+01 | 6.3623E+01 |
| S3 | 2.5233E−01 | −3.7468E+00 | 1.8444E+01 | −4.6741E+01 | 6.4867E+01 |
| S4 | 1.6943E−01 | 8.5782E−01 | −2.6239E+01 | 1.8466E+02 | −6.5188E+02 |
| S5 | −6.8771E−02 | 7.3285E+00 | −8.9347E+01 | 5.3684E+02 | −1.8421E+03 |
| S6 | −5.0969E−01 | 1.0341E+01 | −1.0727E+02 | 6.6121E+02 | −2.5023E+03 |
| S7 | −2.2415E−01 | 4.3067E−01 | −2.6570E−01 | −1.4539E+01 | 8.1434E+01 |
| S8 | −9.9982E−02 | −5.4423E−01 | 2.4358E+00 | −5.9787E+00 | 3.1641E+01 |
| S9 | −2.0884E−01 | 1.3275E+00 | −6.5557E+00 | 1.8486E+01 | −3.2802E+01 |
| S10 | −4.8520E−02 | −4.0860E−01 | 1.3870E+00 | −2.3826E+00 | 2.2757E+00 |
| S11 | 2.0860E−01 | −8.2734E−01 | 5.1952E−01 | 3.4705E−01 | −7.2253E−01 |
| S12 | 4.8435E−01 | −9.0671E−01 | 6.7775E−01 | −2.1193E−01 | −1.1852E−02 |
| S13 | 1.6079E−01 | −1.4465E−01 | 6.7576E−02 | −1.1282E−02 | −2.3287E−03 |
| S14 | −1.0885E−01 | 1.0562E−01 | −6.3390E−02 | 2.2120E−02 | −5.0017E−03 |

| Surface number | A14 | A16 | A18 | A20 |
|---|---|---|---|---|
| S1 | −5.7841E+00 | 2.2342E−01 | 1.1809E+00 | 0.0000E+00 |
| S2 | −4.8415E+01 | 1.5175E+01 | 0.0000E+00 | 0.0000E+00 |
| S3 | −4.6782E+01 | 1.3714E+01 | 0.0000E+00 | 0.0000E+00 |
| S4 | 1.3113E+03 | −1.5203E+03 | 9.4249E+02 | −2.4076E+02 |
| S5 | 3.7918E+03 | −4.6309E+03 | 3.0929E+03 | −8.7002E+02 |
| S6 | 5.8654E+03 | −8.2851E+03 | 6.4532E+03 | −2.1267E+03 |
| S7 | −2.1483E+02 | 3.1257E+02 | −2.4356E+02 | 8.0135E+01 |
| S8 | 1.3970E+01 | −3.0149E+01 | 2.3826E+01 | −6.8143E+00 |
| S9 | 3.5897E+01 | −2.3438E+01 | 8.3606E+00 | −1.2501E+00 |
| S10 | −1.2725E+00 | 4.1796E−01 | −7.5059E−02 | 5.7021E−03 |
| S11 | 4.7620E−01 | −1.5990E−01 | 2.7510E−02 | −1.9261E−03 |

TABLE 5-continued

| | | | | |
|---|---|---|---|---|
| S12 | 3.0303E−02 | −9.6010E−03 | 1.3368E−03 | −7.1940E−05 |
| S13 | 1.4540E−03 | −2.8616E−04 | 2.6730E−05 | −9.9986E−07 |
| S14 | 7.5949E−04 | −7.5231E−05 | 4.4064E−06 | −1.1557E−07 |

TABLE 6

| | |
|---|---|
| f1(mm) | 3.46 |
| f2(mm) | −11.83 |
| f3(mm) | 10.42 |
| f4(mm) | 1487.19 |
| f5(mm) | −40.38 |
| f6(mm) | 3.29 |
| f7(mm) | −1.55 |
| f(mm) | 3.51 |
| TTL(mm) | 3.98 |
| ImgH(mm) | 3.35 |
| Semi-FOV(°) | 38.2 |

Figure 4A:
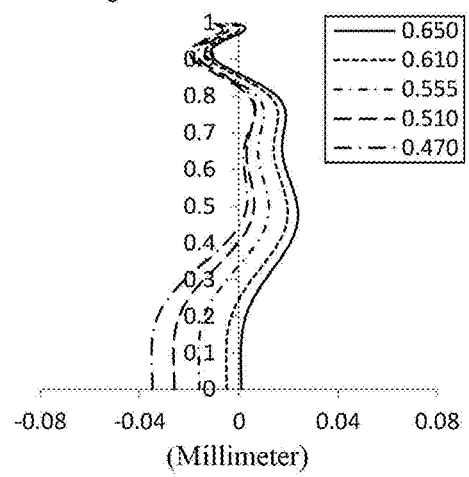
FIGS. 4A-4D illustrate a longitudinal aberration curve, an astigmatic curve, a distortion curve and a lateral color curve of the optical imaging lens group according to example 2, respectively.
Figure 4B:
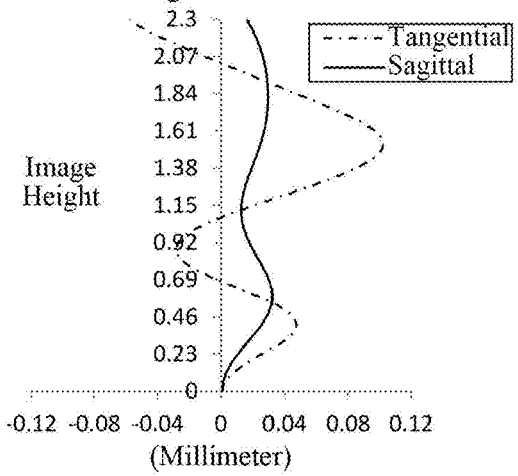
Figure 4C:
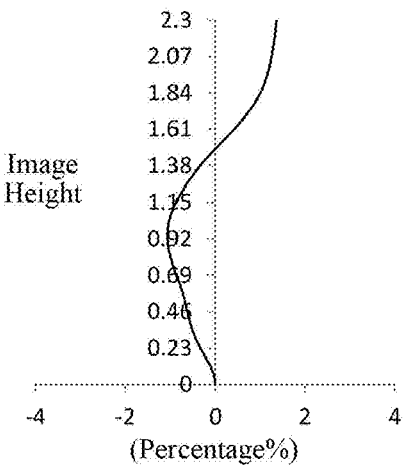
Figure 4D:
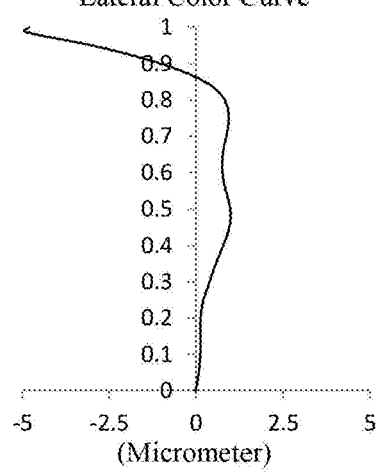

FIG. 4A illustrates a longitudinal aberration curve of the optical imaging lens group according to example 2, representing deviations of focal points focused by light of different wavelengths after passing through the optical imaging lens group. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion corresponding to different image heights. FIG. 4D illustrates a lateral color curve of the optical imaging lens group according to example 2, representing deviations of different image heights on an imaging plane after the light passes through the optical imaging lens group. It can be seen from FIG. 4A to FIG. 4D that the optical imaging lens group provided in example 2 can achieve good image quality.

Example 3

Figure 5:
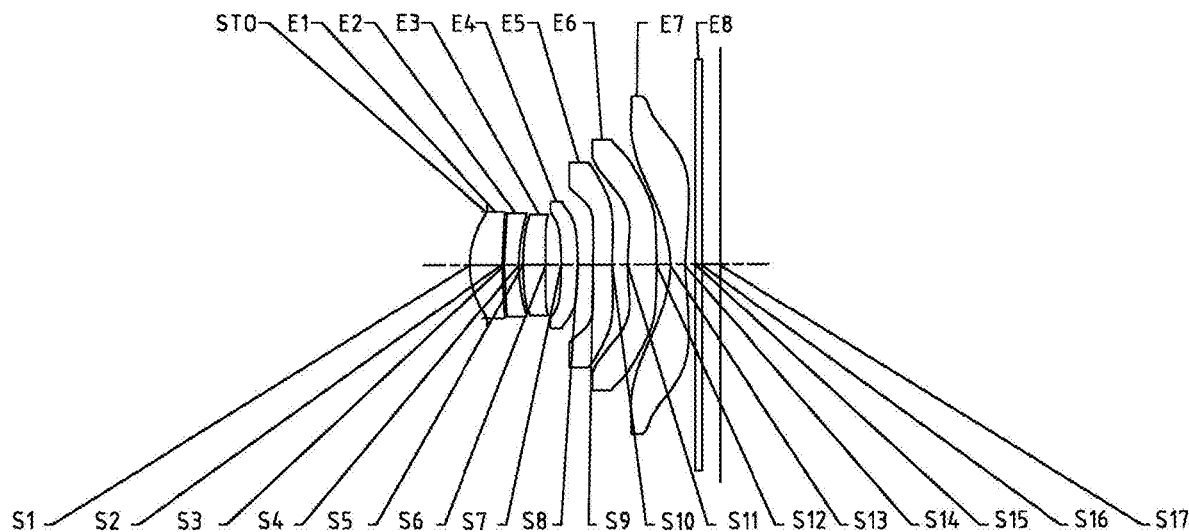
FIG. 5 is a schematic structural view of an optical imaging lens group according to example 3 of the present disclosure.

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 7 shows surface type, radius of curvature, thickness, material and conic coefficient of each lens of the optical imaging lens group in example 3, wherein the units for the radius of curvature and the thickness are millimeter (mm). Table 8 shows high-order coefficients applicable to each aspheric surface in example 3, wherein the surface shape of each aspheric surface may be defined by the formula (1) given in the above example 1. Table 9 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 3.

TABLE 7

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.2767 | | | |
| S1 | Aspheric | 1.3884 | 0.5202 | 1.55 | 56.1 | 0.0000 |
| S2 | Aspheric | 4.3509 | 0.0300 | | | 0.0000 |
| S3 | Aspheric | 3.8864 | 0.2300 | 1.67 | 20.4 | 0.0000 |
| S4 | Aspheric | 2.4705 | 0.0697 | | | 0.0000 |
| S5 | Aspheric | 5.1775 | 0.3589 | 1.55 | 56.1 | 0.0000 |
| S6 | Aspheric | −46.5667 | 0.2461 | | | 0.0000 |
| S7 | Aspheric | −9.4285 | 0.2602 | 1.62 | 25.9 | −18.5451 |
| S8 | Aspheric | −13.8637 | 0.2442 | | | 55.8324 |
| S9 | Aspheric | 9.5063 | 0.3042 | 1.64 | 24 | 20.7348 |
| S10 | Aspheric | 7.9907 | 0.2439 | | | −34.6813 |
| S11 | Aspheric | 3.4320 | 0.4642 | 1.55 | 56.1 | −99.0000 |

TABLE 7-continued

| Surface number | Surface type | Radius of curvature | Thickness | Material Refractive index | Abbe number | Conic coefficient |
|---|---|---|---|---|---|---|
| S12 | Aspheric | −3.6744 | 0.2190 | | | 0.7574 |
| S13 | Aspheric | −1.5342 | 0.2300 | 1.55 | 56.1 | −1.3371 |
| S14 | Aspheric | 2.2181 | 0.1594 | | | −48.1814 |
| S15 | Spherical | Infinite | 0.1100 | 1.52 | 64.2 | |
| S16 | Spherical | Infinite | 0.2900 | | | |
| S17 | Spherical | Infinite | | | | |

TABLE 8

| Surface number | A4 | A6 | A8 | A10 | A12 |
|---|---|---|---|---|---|
| S1 | −1.4556E−02 | 2.3395E−02 | −1.8838E−01 | 5.2088E−01 | −8.3310E−01 |
| S2 | −2.4410E−01 | 5.0793E−01 | −6.9662E−01 | 1.0227E+00 | −1.9969E+00 |
| S3 | −2.6677E−01 | 3.8990E−01 | 4.6144E−01 | −3.2314E+00 | 6.1766E+00 |
| S4 | −8.0049E−02 | 4.8720E−01 | −4.1589E+00 | 2.6391E+01 | −1.0193E+02 |
| S5 | 5.6428E−02 | 7.9240E−02 | −3.2635E−01 | 9.1072E−01 | 3.5298E+00 |
| S6 | 4.9122E−03 | 4.4064E−01 | −3.9815E+00 | 2.3785E+01 | −8.7709E+01 |
| S7 | −7.7723E−02 | −1.3905E+00 | 1.1735E+01 | −6.4362E+01 | 2.1915E+02 |
| S8 | −1.4582E−01 | 6.5169E−02 | −1.6186E+00 | 7.9568E+00 | −2.2988E+01 |
| S9 | −6.6958E−02 | 5.0201E−02 | −7.7075E−01 | 2.5679E+00 | −5.1093E+00 |
| S10 | −4.1531E−02 | −3.3499E−01 | 9.5645E−01 | −1.4068E+00 | 1.1660E+00 |
| S11 | 2.3474E−01 | −9.8112E−01 | 1.0393E+00 | −5.6424E−01 | 1.4296E−01 |
| S12 | 4.8924E−01 | −9.5373E−01 | 8.1966E−01 | −4.0534E−01 | 1.2698E−01 |
| S13 | 1.5030E−01 | −1.1618E−01 | 3.7625E−02 | 4.9283E−03 | −7.2354E−03 |
| S14 | −1.1617E−01 | 1.2597E−01 | −8.0818E−02 | 3.0457E−02 | −7.5328E−03 |

| Surface number | A14 | A16 | A18 | A20 |
|---|---|---|---|---|
| S1 | 5.7661E−01 | −2.7054E−02 | −1.2493E−01 | 0.0000E+00 |
| S2 | 2.2535E+00 | −9.5725E−01 | 0.0000E+00 | 0.0000E+00 |
| S3 | −5.6403E+00 | 2.0806E+00 | 0.0000E+00 | 0.0000E+00 |
| S4 | 2.3327E+02 | −3.0765E+02 | 2.1480E+02 | −6.1302E+01 |
| S5 | −2.9310E+01 | 7.8283E+01 | −9.2415E+01 | 4.0554E+01 |
| S6 | 2.0438E+02 | −2.9085E+02 | 2.3133E+02 | −7.8266E+01 |
| S7 | −4.6864E+02 | 6.1057E+02 | −4.4397E+02 | 1.3881E+02 |
| S8 | 4.0315E+01 | −4.2216E+01 | 2.4190E+01 | −5.7636E+00 |
| S9 | 5.9010E+00 | −3.9937E+00 | 1.4846E+00 | −2.3253E−01 |
| S10 | −5.7015E−01 | 1.6481E−01 | −2.6230E−02 | 1.7784E−03 |
| S11 | 7.1795E−03 | −1.4408E−02 | 3.4227E−03 | −2.7369E−04 |
| S12 | −2.6521E−02 | 3.8373E−03 | −3.8167E−04 | 2.0356E−05 |
| S13 | 2.2814E−03 | −3.5587E−04 | 2.8465E−05 | −9.3535E−07 |
| S14 | 1.2577E−03 | −1.3667E−04 | 8.7424E−06 | −2.5057E−07 |

TABLE 9

| | |
|---|---|
| f1(mm) | 3.52 |
| f2(mm) | −10.88 |
| f3(mm) | 8.56 |
| f4(mm) | −48.68 |
| f5(mm) | −84.94 |
| f6(mm) | 3.33 |
| f7(mm) | −1.63 |
| f(mm) | 3.50 |
| TTL(mm) | 3.98 |
| ImgH(mm) | 3.35 |
| Semi-FOV(°) | 38.9 |

Figure 6A:
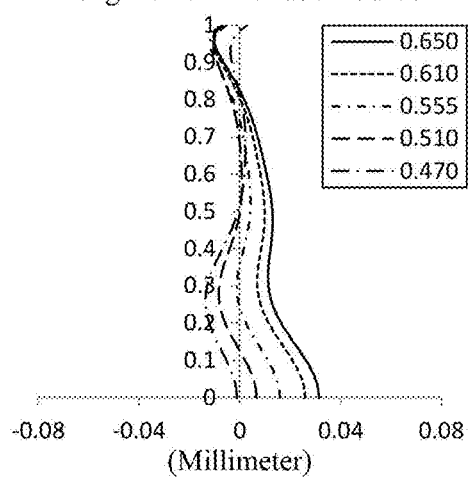
FIGS. 6A-6D illustrate a longitudinal aberration curve, an astigmatic curve, a distortion curve and a lateral color curve of the optical imaging lens group according to example 3, respectively.
Figure 6B:
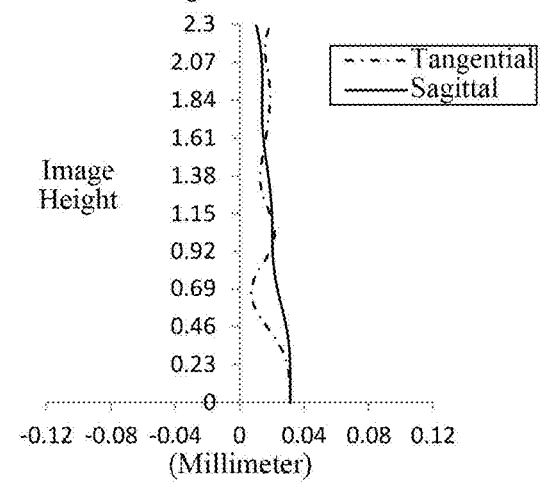
Figure 6C:
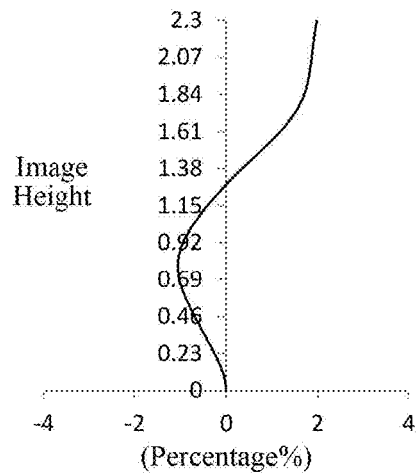
Figure 6D:
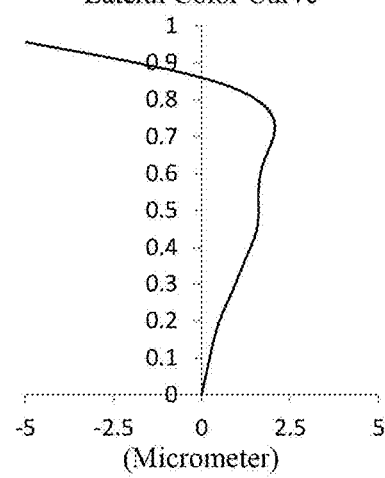

FIG. 6A illustrates a longitudinal aberration curve of the optical imaging lens group according to example 3, representing deviations of focal points focused by light of different wavelengths after passing through the optical imaging lens group. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion corresponding to different image heights. FIG. 6D illustrates a lateral color curve of the optical imaging lens group according to example 3, representing deviations of different image heights on an imaging plane after the light passes through the optical imaging lens group. It can be seen from FIG. 6A to FIG. 6D that the optical imaging lens group provided in example 3 can achieve good image quality.

Example 4

Figure 7:
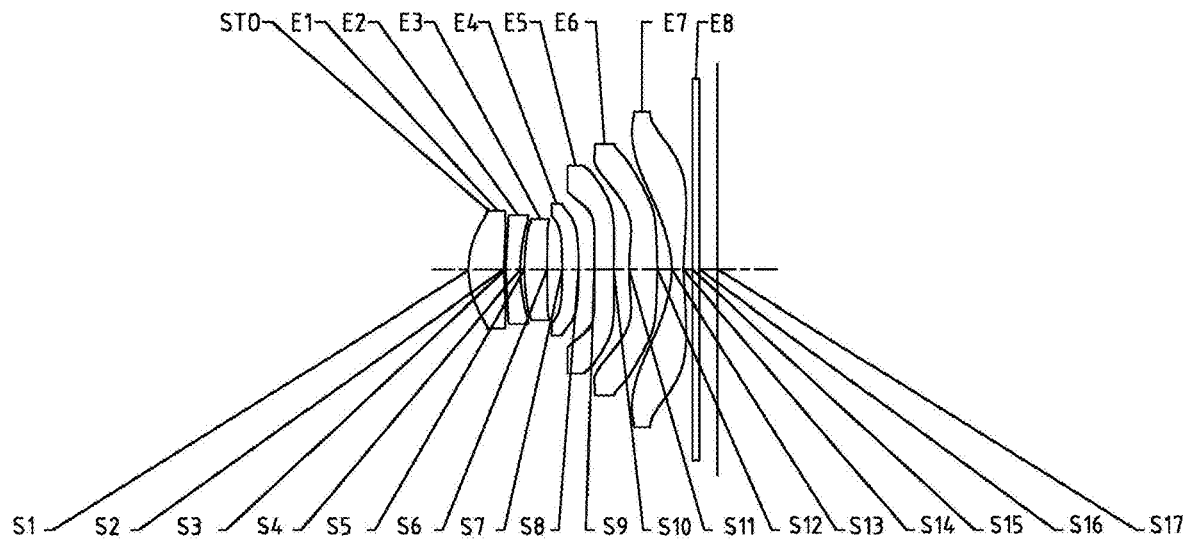
FIG. 7 is a schematic structural view of an optical imaging lens group according to example 4 of the present disclosure.

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 10 shows surface type, radius of curvature, thickness, material and conic coefficient of each lens of the optical imaging lens group in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 4.

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3199 | | | |
| S1 | Aspheric | 1.4048 | 0.5682 | 1.55 | 56.1 | 0.0000 |
| S2 | Aspheric | 4.1246 | 0.0300 | | | 0.0000 |
| S3 | Aspheric | 3.6588 | 0.2300 | 1.67 | 20.4 | 0.0000 |
| S4 | Aspheric | 2.3081 | 0.0699 | | | 0.0000 |
| S5 | Aspheric | 4.1521 | 0.3654 | 1.55 | 56.1 | 0.0000 |
| S6 | Aspheric | −179.4013 | 0.2419 | | | 0.0000 |
| S7 | Aspheric | −15.3365 | 0.2592 | 1.65 | 23.5 | −73.7299 |
| S8 | Aspheric | −20.1562 | 0.2402 | | | 99.0000 |
| S9 | Aspheric | 11.8102 | 0.3120 | 1.64 | 24 | 24.4137 |
| S10 | Aspheric | 8.1693 | 0.2482 | | | −44.0535 |
| S11 | Aspheric | 3.5982 | 0.4538 | 1.55 | 56.1 | −81.5221 |
| S12 | Aspheric | −3.6739 | 0.2312 | | | 0.6855 |
| S13 | Aspheric | −1.4853 | 0.1817 | 1.55 | 56.1 | −1.3516 |
| S14 | Aspheric | 2.3570 | 0.1485 | | | −62.6486 |
| S15 | Spherical | Infinite | 0.1100 | 1.52 | 64.2 | |
| S16 | Spherical | Infinite | 0.2900 | | | |
| S17 | Spherical | Infinite | | | | |

TABLE 11

| Surface number | A4 | A6 | A8 | A10 | A12 |
|---|---|---|---|---|---|
| S1 | −1.2022E−02 | −3.1761E−02 | 8.8246E−02 | −2.8440E−01 | 3.7800E−01 |
| S2 | −2.2814E−01 | 1.5133E−01 | 9.5734E−01 | −3.9626E+00 | 6.8380E+00 |
| S3 | −2.5275E−01 | 1.3963E−01 | 1.3296E+00 | −5.1175E+00 | 8.8402E+00 |
| S4 | −6.0698E−02 | 2.9750E−02 | 4.5537E−02 | 5.5390E−01 | −3.7890E+00 |
| S5 | 5.3926E−02 | 7.4059E−02 | −1.6599E+00 | 1.2322E+01 | −4.8142E+01 |
| S6 | 6.8112E−03 | 1.2736E−01 | −6.5735E−01 | 2.3280E+00 | −4.4572E+00 |
| S7 | −1.2301E−01 | −3.1717E−01 | 1.3274E+00 | −5.5607E+00 | 1.3348E+01 |
| S8 | −1.3105E−01 | 7.0716E−02 | −1.0158E+00 | 3.5519E+00 | −8.4557E+00 |
| S9 | −8.9509E−02 | 5.5002E−02 | −2.0203E−01 | 3.1209E−01 | −9.4735E−01 |
| S10 | −1.1210E−01 | −4.0224E−02 | 3.2788E−01 | −5.9868E−01 | 5.2389E−01 |
| S11 | 1.5759E−01 | −7.0933E−01 | 6.3699E−01 | −2.7412E−01 | 6.2370E−02 |
| S12 | 4.6952E−01 | −8.8553E−01 | 7.2669E−01 | −3.3798E−01 | 9.7205E−02 |
| S13 | 1.5174E−01 | −1.2000E−01 | 4.2567E−02 | 1.8187E−03 | −6.1167E−03 |
| S14 | −1.1773E−01 | 1.3061E−01 | −8.2521E−02 | 2.8550E−02 | −5.8160E−03 |

| Surface number | A14 | A16 | A18 | A20 |
|---|---|---|---|---|
| S1 | −2.2410E−01 | −2.9160E−02 | 5.0579E−02 | 0.0000E+00 |
| S2 | −5.9097E+00 | 2.0589E+00 | 0.0000E+00 | 0.0000E+00 |
| S3 | −7.6985E+00 | 2.7046E+00 | 0.0000E+00 | 0.0000E+00 |
| S4 | 6.7773E+00 | −2.4774E−01 | −9.4551E+00 | 6.2783E+00 |

TABLE 11-continued

| | | | | |
|---|---|---|---|---|
| S5 | 1.0901E+02 | −1.4072E+02 | 9.6775E+01 | −2.7769E+01 |
| S6 | 5.9441E+00 | −6.0062E+00 | 5.1643E+00 | −2.0391E+00 |
| S7 | −1.7784E+01 | 9.3085E+00 | 2.8433E+00 | −3.4700E+00 |
| S8 | 1.3347E+01 | −1.3310E+01 | 7.5311E+00 | −1.7993E+00 |
| S9 | 1.6752E+00 | −1.6730E+00 | 8.7673E−01 | −1.8123E−01 |
| S10 | −2.5746E−01 | 7.4438E−02 | −1.2060E−02 | 8.5442E−04 |
| S11 | −8.9635E−03 | 1.9282E−03 | −4.5674E−04 | 4.2564E−05 |
| S12 | −1.8024E−02 | 2.2797E−03 | −2.1293E−04 | 1.2141E−05 |
| S13 | 2.0354E−03 | −3.2265E−04 | 2.5903E−05 | −8.4853E−07 |
| S14 | 6.8746E−04 | −4.1064E−05 | 6.4835E−07 | 2.4984E−08 |

TABLE 12

| | |
|---|---|
| f1(mm) | 3.63 |
| f2(mm) | −10.07 |
| f3(mm) | 7.44 |
| f4(mm) | −101.65 |
| f5(mm) | −42.82 |
| f6(mm) | 3.40 |
| f7(mm) | −1.64 |
| f(mm) | 3.50 |
| TTL(mm) | 3.98 |
| ImgH(mm) | 3.30 |
| Semi-FOV(°) | 40.9 |

Figure 8A:
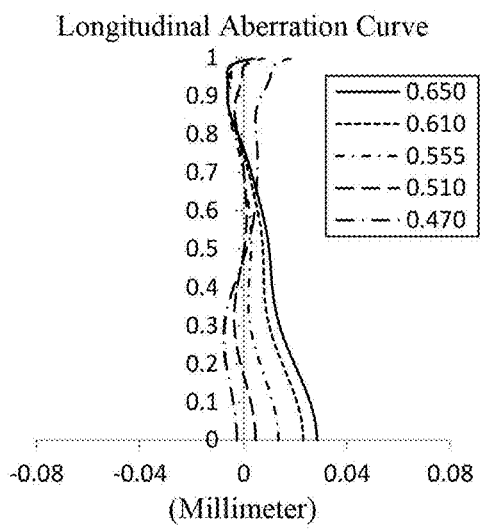
FIGS. 8A-8D illustrate a longitudinal aberration curve, an astigmatic curve, a distortion curve and a lateral color curve of the optical imaging lens group according to example 4, respectively.
Figure 8B:
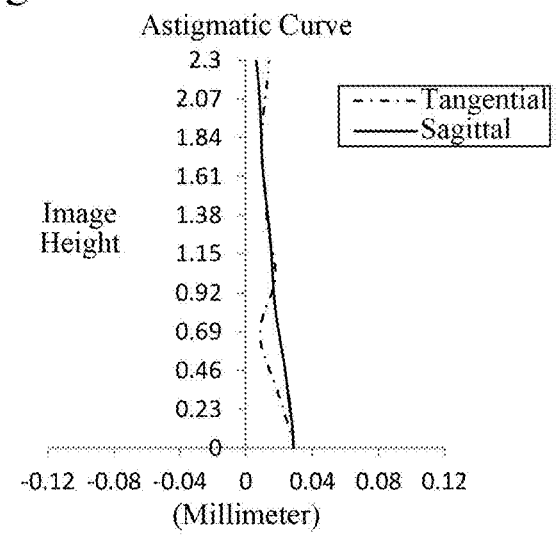
Figure 8C:
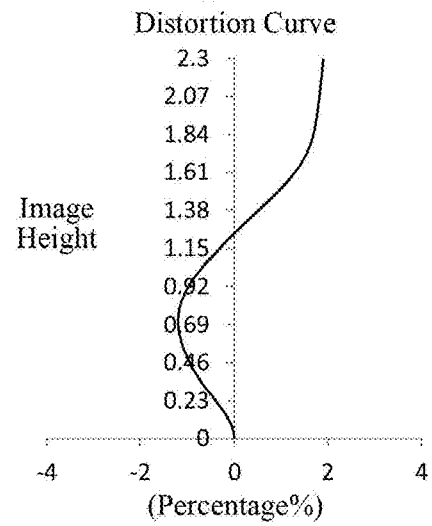
Figure 8D:
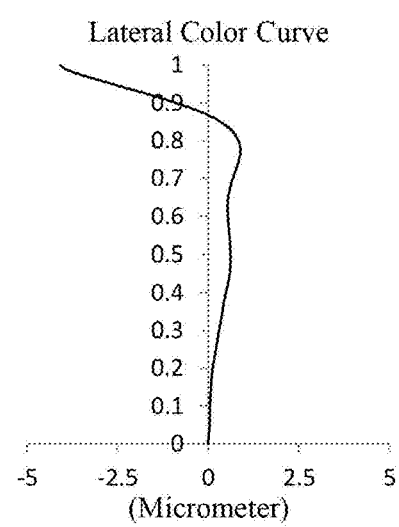

FIG. 8A illustrates a longitudinal aberration curve of the optical imaging lens group according to example 4, representing deviations of focal points focused by light of different wavelengths after passing through the optical imaging lens group. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion corresponding to different image heights. FIG. 8D illustrates a lateral color curve of the optical imaging lens group according to example 4, representing deviations of different image heights on an imaging plane after the light passes through the optical imaging lens group. It can be seen from FIG. 8A to FIG. 8D that the optical imaging lens group provided in example 4 can achieve good image quality.

Example 5

Figure 9:
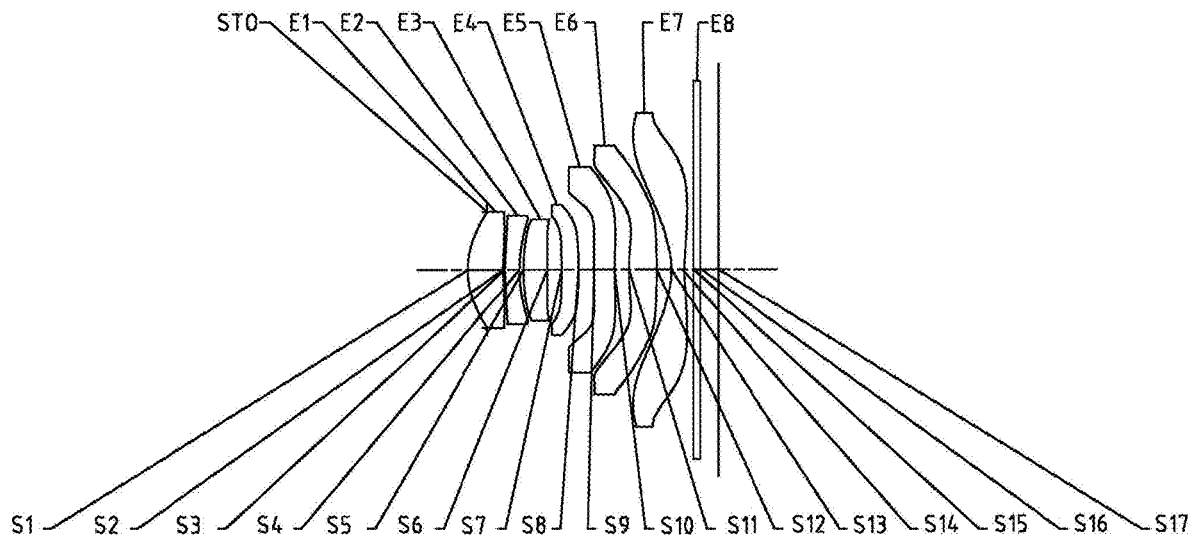
FIG. 9 is a schematic structural view of an optical imaging lens group according to example 5 of the present disclosure.

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 13 shows surface type, radius of curvature, thickness, material and conic coefficient of each lens of the optical imaging lens group in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 5.

TABLE 13

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.3052 | | | |
| S1 | Aspheric | 1.4193 | 0.5597 | 1.55 | 56.1 | 0.0000 |
| S2 | Aspheric | 3.9503 | 0.0300 | | | 0.0000 |
| S3 | Aspheric | 3.5357 | 0.2300 | 1.67 | 20.4 | 0.0000 |
| S4 | Aspheric | 2.2771 | 0.0667 | | | 0.0000 |

TABLE 13-continued

| Surface number | Surface type | Radius of curvature | Thickness | Material Refractive index | Abbe number | Conic coefficient |
|---|---|---|---|---|---|---|
| S5 | Aspheric | 3.8651 | 0.3754 | 1.55 | 56.1 | 0.0000 |
| S6 | Aspheric | 483.8513 | 0.2304 | | | 0.0000 |
| S7 | Aspheric | −30.3711 | 0.2641 | 1.65 | 23.5 | −99.0000 |
| S8 | Aspheric | −25.3764 | 0.2465 | | | 99.0000 |
| S9 | Aspheric | 10.3706 | 0.3258 | 1.64 | 24 | 13.1285 |
| S10 | Aspheric | 6.7963 | 0.2305 | | | −28.6120 |
| S11 | Aspheric | 3.8634 | 0.4426 | 1.55 | 56.1 | −75.7212 |
| S12 | Aspheric | −3.6864 | 0.2298 | | | 0.6491 |
| S13 | Aspheric | −1.4948 | 0.2000 | 1.55 | 56.1 | −1.3689 |
| S14 | Aspheric | 2.3656 | 0.1484 | | | −66.1784 |
| S15 | Spherical | Infinite | 0.1100 | 1.52 | 64.2 | |
| S16 | Spherical | Infinite | 0.2900 | | | |
| S17 | Spherical | Infinite | | | | |

TABLE 14

| Surface number | A4 | A6 | A8 | A10 | A12 |
|---|---|---|---|---|---|
| S1 | −1.6558E−02 | −2.0581E−02 | 2.6988E−02 | −1.5386E−01 | 2.1289E−01 |
| S2 | −2.5537E−01 | 1.3449E−01 | 9.1190E−01 | −3.3002E+00 | 5.1104E+00 |
| S3 | −2.7367E−01 | 1.0663E−01 | 1.4115E+00 | −4.8020E+00 | 7.6023E+00 |
| S4 | −5.3238E−02 | −4.7780E−02 | 6.4623E−01 | −2.5485E+00 | 7.3837E+00 |
| S5 | 6.8617E−02 | −1.0301E−01 | 4.6182E−01 | −1.7851E+00 | 7.1576E+00 |
| S6 | 1.1521E−02 | 1.1284E−02 | 2.6502E−01 | −2.2627E+00 | 1.0348E+01 |
| S7 | −1.3838E−01 | −1.7725E−03 | −1.2358E+00 | 7.1892E+00 | −2.6228E+01 |
| S8 | −1.4073E−01 | 1.9299E−01 | −1.9149E+00 | 7.3283E+00 | −1.7838E+01 |
| S9 | −8.1443E−02 | 2.0314E−02 | −2.8971E−01 | 9.3026E−01 | −2.3724E+00 |
| S10 | −7.3445E−02 | −1.6968E−01 | 5.6067E−01 | −8.6376E−01 | 7.4482E−01 |
| S11 | 1.7032E−01 | −7.8619E−01 | 8.0880E−01 | −5.1304E−01 | 2.7604E−01 |
| S12 | 5.0264E−01 | −1.0136E+00 | 9.5232E−01 | −5.5865E−01 | 2.2664E−01 |
| S13 | 1.6257E−01 | −1.5473E−01 | 8.6261E−02 | −2.6088E−02 | 4.1099E−03 |
| S14 | −1.1327E−01 | 1.3012E−01 | −8.7985E−02 | 3.3577E−02 | −7.7965E−03 |

| Surface number | A14 | A16 | A18 | A20 |
|---|---|---|---|---|
| S1 | −1.3173E−01 | −3.6233E−02 | 4.5290E−02 | 0.0000E+00 |
| S2 | −3.9754E+00 | 1.2478E+00 | 0.0000E+00 | 0.0000E+00 |
| S3 | −6.0978E+00 | 1.9662E+00 | 0.0000E+00 | 0.0000E+00 |
| S4 | −1.9299E+01 | 3.6014E+01 | −3.6565E+01 | 1.4665E+01 |
| S5 | −2.1572E+01 | 4.0940E+01 | −4.0290E+01 | 1.5538E+01 |
| S6 | −2.5393E+01 | 3.5803E+01 | −2.6843E+01 | 8.7176E+00 |
| S7 | 5.9226E+01 | −8.2014E+01 | 6.3032E+01 | −2.0381E+01 |
| S8 | 2.7549E+01 | −2.6204E+01 | 1.3970E+01 | −3.1555E+00 |
| S9 | 3.5046E+00 | −3.0507E+00 | 1.4397E+00 | −2.7685E−01 |
| S10 | −3.8659E−01 | 1.2162E−01 | −2.1511E−02 | 1.6438E−03 |
| S11 | −1.2640E−01 | 3.9575E−02 | −6.8730E−03 | 4.9065E−04 |
| S12 | −6.4828E−02 | 1.2526E−02 | −1.4604E−03 | 7.7045E−05 |
| S13 | −2.1401E−04 | −2.8282E−05 | 4.7232E−06 | −2.0186E−07 |
| S14 | 1.1027E−03 | −8.9033E−05 | 3.4985E−06 | −4.1693E−08 |

TABLE 15

| | |
|---|---|
| f1(mm) | 3.76 |
| f2(mm) | −10.35 |
| f3(mm) | 7.13 |
| f4(mm) | 234.53 |
| f5(mm) | −31.93 |
| f6(mm) | 3.53 |
| f7(mm) | −1.68 |
| f(mm) | 3.48 |
| TTL(mm) | 3.98 |
| ImgH(mm) | 3.30 |
| Semi-FOV(°) | 42.0 |

Figure 10A:
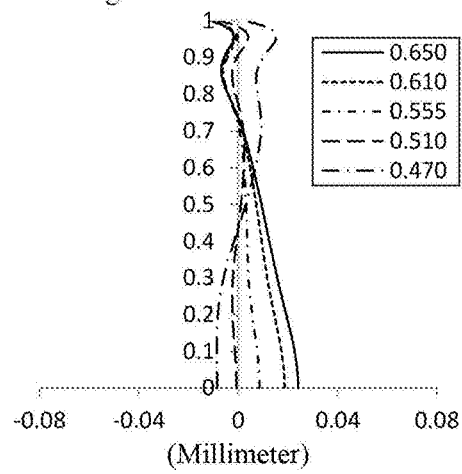
FIGS. 10A-10D illustrate a longitudinal aberration curve, an astigmatic curve, a distortion curve and a lateral color curve of the optical imaging lens group according to example 5, respectively.
Figure 10B:
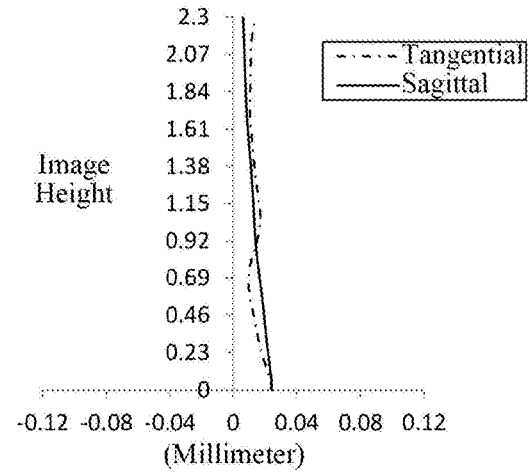
Figure 10C:
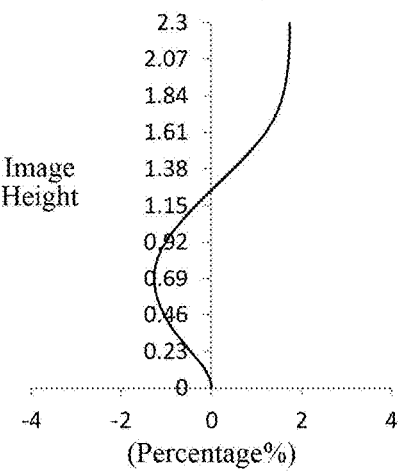
Figure 10D:
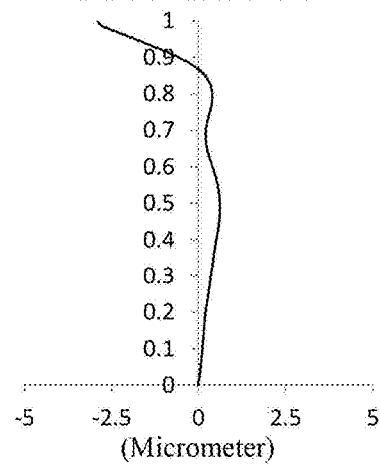

FIG. 10A illustrates a longitudinal aberration curve of the optical imaging lens group according to example 5, representing deviations of focal points focused by light of different wavelengths after passing through the optical imaging lens group. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion corresponding to different image heights. FIG. 10D illustrates a lateral color curve of the optical imaging lens group according to example 5, representing deviations of different image heights on an imaging plane after the light passes through the optical imaging lens group. It can be seen from FIG. 10A to FIG. 10D that the optical imaging lens group provided in example 5 can achieve good image quality.

Example 6

Figure 11:
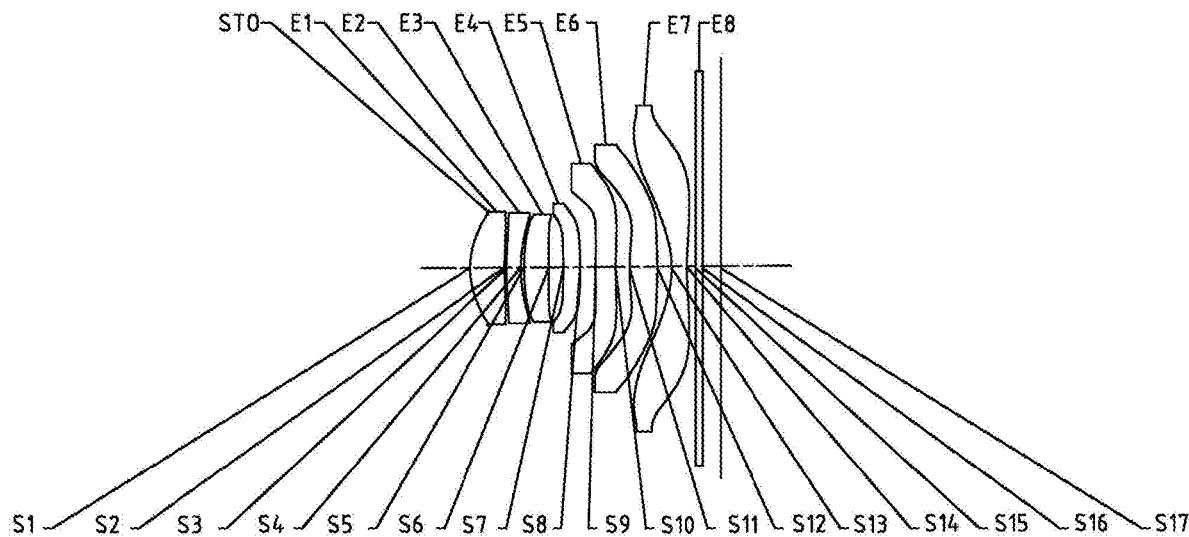
FIG. 11 is a schematic structural view of an optical imaging lens group according to example 6 of the present disclosure.

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 16 shows surface type, radius of curvature, thickness, material and conic coefficient of each lens of the optical imaging lens group in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 6.

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2908 | | | |
| S1 | Aspheric | 1.4026 | 0.5413 | 1.55 | 56.1 | 0.0000 |
| S2 | Aspheric | 4.0126 | 0.0330 | | | 0.0000 |
| S3 | Aspheric | 3.5428 | 0.2300 | 1.67 | 20.4 | 0.0000 |
| S4 | Aspheric | 2.2007 | 0.0518 | | | 0.0000 |
| S5 | Aspheric | 3.9136 | 0.3927 | 1.55 | 56.1 | 0.0000 |
| S6 | Aspheric | −208.6325 | 0.2334 | | | 0.0000 |
| S7 | Aspheric | −24.2510 | 0.2630 | 1.65 | 23.5 | −8.8335 |
| S8 | Aspheric | −18.1326 | 0.2468 | | | 99.0000 |
| S9 | Aspheric | 10.4226 | 0.3185 | 1.64 | 24 | 15.2343 |
| S10 | Aspheric | 6.0395 | 0.2201 | | | −27.9732 |
| S11 | Aspheric | 3.6117 | 0.4449 | 1.55 | 56.1 | −65.7353 |
| S12 | Aspheric | −3.7130 | 0.2271 | | | 0.5991 |
| S13 | Aspheric | −1.5196 | 0.2300 | 1.55 | 56.1 | −1.3793 |
| S14 | Aspheric | 2.4369 | 0.1475 | | | −65.2363 |
| S15 | Spherical | Infinite | 0.1100 | 1.52 | 64.2 | |
| S16 | Spherical | Infinite | 0.2900 | | | |
| S17 | Spherical | Infinite | | | | |

TABLE 17

| Surface number | A4 | A6 | A8 | A10 | A12 |
|---|---|---|---|---|---|
| S1 | −1.3655E−02 | −2.8994E−02 | 6.5275E−02 | −2.3971E−01 | 3.2864E−01 |
| S2 | −2.1900E−01 | 6.0090E−02 | 9.8290E−01 | −3.3876E+00 | 5.4809E+00 |
| S3 | −2.4952E−01 | 4.3766E−02 | 1.3435E+00 | −4.2891E+00 | 6.8007E+00 |
| S4 | −4.6806E−02 | 3.9296E−03 | −5.9125E−01 | 6.2535E+00 | −2.7550E+01 |
| S5 | 7.8596E−02 | −3.0620E−02 | −8.2223E−01 | 7.0921E+00 | −2.8151E+01 |
| S6 | 1.6889E−02 | −6.6766E−02 | 1.0844E+00 | −7.6137E+00 | 3.2088E+01 |
| S7 | −1.4026E−01 | 1.8741E−01 | −3.2036E+00 | 1.8229E+01 | −6.4217E+01 |
| S8 | −1.3920E−01 | 2.8379E−01 | −2.4691E+00 | 8.9539E+00 | −2.0534E+01 |
| S9 | −9.0111E−02 | 9.3713E−02 | −4.5480E−01 | 1.0528E+00 | −2.2351E+00 |
| S10 | −9.1083E−02 | −1.0988E−01 | 4.7588E−01 | −8.0973E−01 | 7.4304E−01 |

TABLE 17-continued

| | | | | | |
|---|---|---|---|---|---|
| S11 | 1.7964E−01 | −8.4657E−01 | 9.6006E−01 | −7.2834E−01 | 4.6892E−01 |
| S12 | 5.1198E−01 | −1.0391E+00 | 9.8379E−01 | −5.7834E−01 | 2.3297E−01 |
| S13 | 1.5694E−01 | −1.3978E−01 | 6.9061E−02 | −1.6006E−02 | 7.1034E−04 |
| S14 | −1.1715E−01 | 1.3596E−01 | −9.1461E−02 | 3.4597E−02 | −7.9689E−03 |

| Surface number | A14 | A16 | A18 | A20 |
|---|---|---|---|---|
| S1 | −2.2355E−01 | 2.9775E−03 | 3.5767E−02 | 0.0000E+00 |
| S2 | −4.6506E+00 | 1.6326E+00 | 0.0000E+00 | 0.0000E+00 |
| S3 | −5.7073E+00 | 1.9878E+00 | 0.0000E+00 | 0.0000E+00 |
| S4 | 6.2677E+01 | −7.5587E+01 | 4.4632E+01 | −9.7269E+00 |
| S5 | 6.1121E+01 | −7.0271E+01 | 3.8944E+01 | −7.6298E+00 |
| S6 | −8.0007E+01 | 1.1808E+02 | −9.4771E+01 | 3.2283E+01 |
| S7 | 1.4077E+02 | −1.8858E+02 | 1.4058E+02 | −4.4564E+01 |
| S8 | 2.9846E+01 | −2.6690E+01 | 1.3334E+01 | −2.8021E+00 |
| S9 | 3.1265E+00 | −2.7103E+00 | 1.2962E+00 | −2.5314E−01 |
| S10 | −4.0476E−01 | 1.3235E−01 | −2.4088E−02 | 1.8754E−03 |
| S11 | −2.3390E−01 | 7.5011E−02 | −1.3140E−02 | 9.4724E−04 |
| S12 | −6.5703E−02 | 1.2504E−02 | −1.4422E−03 | 7.5777E−05 |
| S13 | 4.7745E−04 | −1.1254E−04 | 1.0413E−05 | −3.6621E−07 |
| S14 | 1.1271E−03 | −9.3161E−05 | 3.9962E−06 | −6.5495E−08 |

TABLE 18

| | |
|---|---|
| f1(mm) | 3.68 |
| f2(mm) | −9.36 |
| f3(mm) | 7.04 |
| f4(mm) | 109.65 |
| f5(mm) | −23.08 |
| f6(mm) | 3.43 |
| f7(mm) | −1.68 |
| f(mm) | 3.48 |
| TTL(mm) | 3.98 |
| ImgH(mm) | 3.35 |
| Semi-FOV(°) | 41.3 |

Figure 12A:
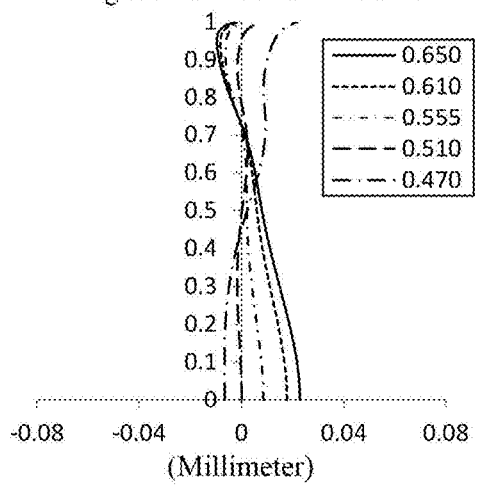
FIGS. 12A-12D illustrate a longitudinal aberration curve, an astigmatic curve, a distortion curve and a lateral color curve of the optical imaging lens group according to example 6, respectively.
Figure 12B:
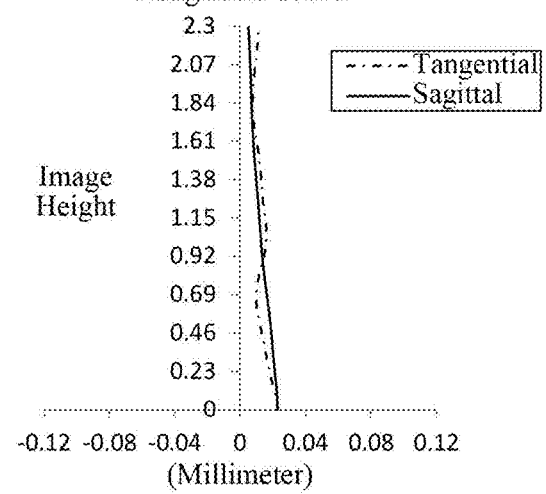
Figure 12C:
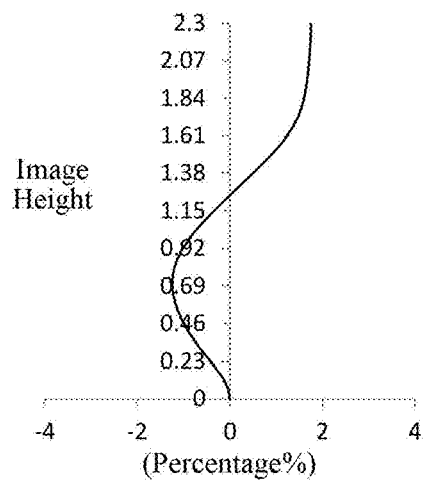
Figure 12D:
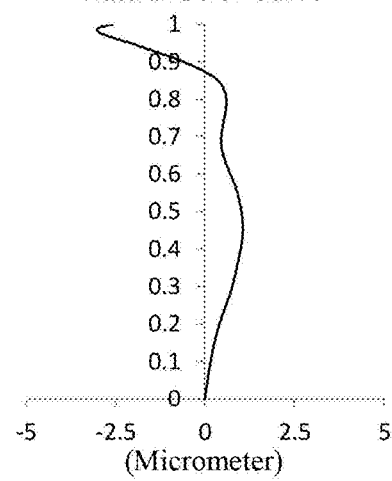

FIG. 12A illustrates a longitudinal aberration curve of the optical imaging lens group according to example 6, representing deviations of focal points focused by light of different wavelengths after passing through the optical imaging lens group. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion corresponding to different image heights. FIG. 12D illustrates a lateral color curve of the optical imaging lens group according to example 6, representing deviations of different image heights on an imaging plane after the light passes through the optical imaging lens group. It can be seen from FIG. 12A to FIG. 12D that the optical imaging lens group provided in example 6 can achieve good image quality.

Example 7

Figure 13:
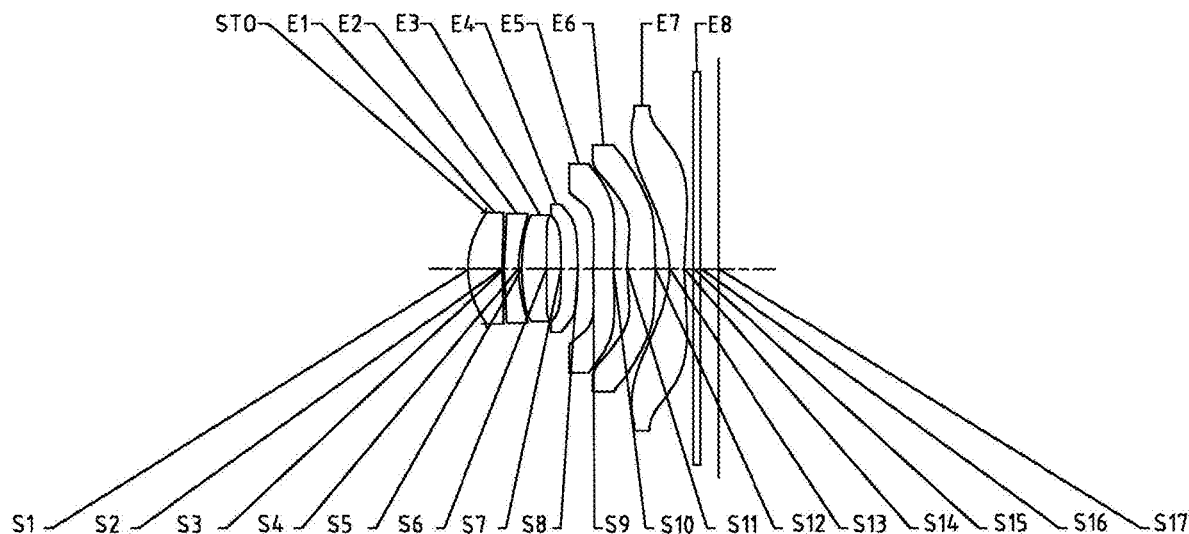
FIG. 13 is a schematic structural view of an optical imaging lens group according to example 7 of the present disclosure.

An optical imaging lens group according to example 7 of the present disclosure is described below with reference to FIG. 13 to FIG. 14D. FIG. 13 shows a schematic structural view of the optical imaging lens group according to example 7 of the present disclosure.

As shown in FIG. 13, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 19 shows surface type, radius of curvature, thickness, material and conic coefficient of each lens of the optical imaging lens group in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 7.

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2862 | | | |
| S1 | Aspheric | 1.3952 | 0.5343 | 1.55 | 56.1 | 0.0000 |
| S2 | Aspheric | 3.9172 | 0.0300 | | | 0.0000 |
| S3 | Aspheric | 3.5316 | 0.2300 | 1.67 | 20.4 | 0.0000 |
| S4 | Aspheric | 2.2835 | 0.0682 | | | 0.0000 |
| S5 | Aspheric | 4.1325 | 0.3760 | 1.55 | 56.1 | 0.0000 |
| S6 | Aspheric | −165.5529 | 0.2373 | | | 0.0000 |
| S7 | Aspheric | −22.2362 | 0.2569 | 1.65 | 23.5 | −99.0000 |
| S8 | Aspheric | −28.7973 | 0.2369 | | | 99.0000 |
| S9 | Aspheric | 10.8851 | 0.3165 | 1.64 | 24 | 23.5310 |
| S10 | Aspheric | 7.2350 | 0.2356 | | | −29.6997 |
| S11 | Aspheric | 3.5458 | 0.4521 | 1.55 | 56.1 | −70.9047 |
| S12 | Aspheric | −3.6946 | 0.2249 | | | 0.6563 |
| S13 | Aspheric | −1.5237 | 0.2300 | 1.55 | 56.1 | −1.3556 |
| S14 | Aspheric | 2.3778 | 0.1514 | | | −58.3165 |
| S15 | Spherical | Infinite | 0.1100 | 1.52 | 64.2 | |
| S16 | Spherical | Infinite | 0.2900 | | | |
| S17 | Spherical | Infinite | | | | |

TABLE 20

| Surface number | A4 | A6 | A8 | A10 | A12 |
|---|---|---|---|---|---|
| S1 | −1.3295E−02 | −2.0320E−02 | 4.7673E−02 | −2.1846E−01 | 3.3388E−01 |
| S2 | −2.4306E−01 | 1.2282E−01 | 1.1323E+00 | −4.4849E+00 | 8.0947E+00 |
| S3 | −2.7248E−01 | 1.3882E−01 | 1.2356E+00 | −4.4827E+00 | 7.6921E+00 |
| S4 | −5.2422E−02 | −7.2284E−02 | 6.1242E−01 | −1.8013E+00 | 2.6908E+00 |
| S5 | 6.7174E−02 | 5.3895E−03 | −1.1000E+00 | 8.5436E+00 | −3.3700E+01 |
| S6 | 1.9677E−02 | −5.2550E−03 | 3.5202E−01 | −2.8302E+00 | 1.2940E+01 |
| S7 | −1.4747E−01 | 1.8774E−01 | −2.9615E+00 | 1.6243E+01 | −5.5780E+01 |
| S8 | −1.5366E−01 | 3.7817E−01 | −2.9494E+00 | 1.0693E+01 | −2.4900E+01 |
| S9 | −9.4891E−02 | 1.2630E−01 | −2.8695E−01 | −2.1338E−02 | 3.4023E−01 |
| S10 | −1.2652E−01 | 6.0444E−02 | 1.0885E−01 | −3.2568E−01 | 3.1696E−01 |
| S11 | 1.4885E−01 | −7.1025E−01 | 7.0851E−01 | −4.4106E−01 | 2.4411E−01 |
| S12 | 4.8165E−01 | −9.2895E−01 | 8.0941E−01 | −4.2454E−01 | 1.5034E−01 |
| S13 | 1.5380E−01 | −1.2789E−01 | 5.3002E−02 | −5.2438E−03 | −3.3706E−03 |
| S14 | −1.1514E−01 | 1.2506E−01 | −7.6460E−02 | 2.5199E−02 | −1.7541E−03 |

| Surface number | A14 | A16 | A18 | A20 |
|---|---|---|---|---|
| S1 | −2.4415E−01 | 4.3121E−03 | 3.7943E−02 | 0.0000E+00 |
| S2 | −7.6649E+00 | 2.9898E+00 | 0.0000E+00 | 0.0000E+00 |
| S3 | −7.0275E+00 | 2.6846E+00 | 0.0000E+00 | 0.0000E+00 |
| S4 | −3.7859E+00 | 8.9196E+00 | −1.2769E+01 | 6.3534E+00 |
| S5 | 7.6751E+01 | −9.8604E+01 | 6.6970E+01 | −1.8934E+01 |
| S6 | −3.2794E+01 | 4.8254E+01 | −3.7901E+01 | 1.2684E+01 |
| S7 | 1.2002E+02 | −1.5852E+02 | 1.1681E+02 | −3.6532E+01 |
| S8 | 3.7171E+01 | −3.4417E+01 | 1.7966E+01 | −4.0016E+00 |
| S9 | −2.5119E−01 | −1.8250E−01 | 2.8798E−01 | −8.7351E−02 |
| S10 | −1.5942E−01 | 4.5545E−02 | −7.1407E−03 | 4.8252E−04 |
| S11 | −1.1694E−01 | 3.7751E−02 | −6.6929E−03 | 4.8684E−04 |
| S12 | −3.7867E−02 | 6.7441E−03 | −7.7211E−04 | 4.2197E−05 |
| S13 | 1.3964E−03 | −2.3456E−04 | 1.9256E−05 | −6.3648E−07 |
| S14 | 4.8596E−04 | −1.8657E−05 | −6.8697E−07 | 5.7741E−08 |

TABLE 21

| f1(mm) | 3.69 |
|---|---|
| f2(mm) | −10.47 |
| f3(mm) | 7.39 |
| f4(mm) | −153.77 |
| f5(mm) | −34.88 |
| f6(mm) | 3.39 |
| f7(mm) | −1.67 |
| f(mm) | 3.48 |

TABLE 21-continued

| TTL(mm) | 3.98 |
|---|---|
| ImgH(mm) | 3.35 |
| Semi-FOV(°) | 40.9 |

Figure 14A:
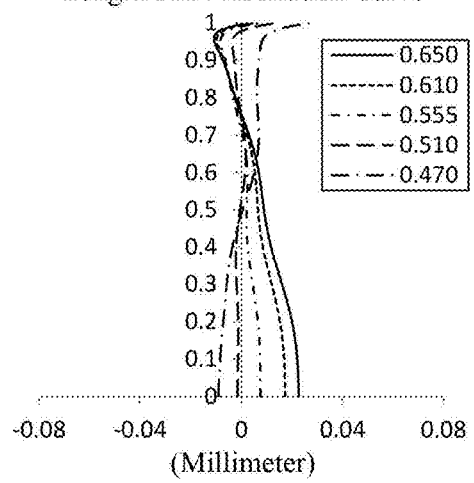
FIGS. 14A-14D illustrate a longitudinal aberration curve, an astigmatic curve, a distortion curve and a lateral color curve of the optical imaging lens group according to example 7, respectively.
Figure 14B:
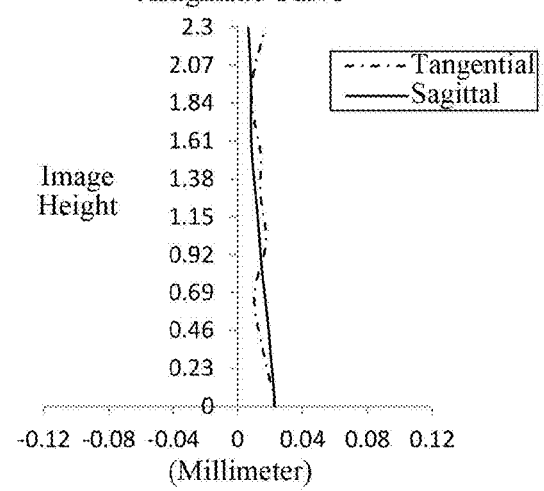
Figure 14C:
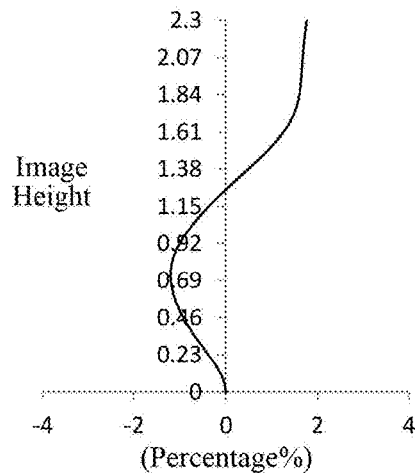
Figure 14D:
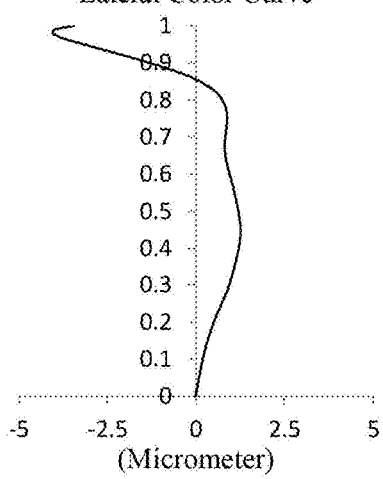

FIG. 14A illustrates a longitudinal aberration curve of the optical imaging lens group according to example 7, representing deviations of focal points focused by light of different wavelengths after passing through the optical imaging lens group. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion corresponding to different image heights. FIG. 14D illustrates a lateral color curve of the optical imaging lens group according to example 7, representing deviations of different image heights on an imaging plane after the light passes through the optical imaging lens group. It can be seen from FIG. 14A to FIG. 14D that the optical imaging lens group provided in example 7 can achieve good image quality.

Example 8

Figure 15:
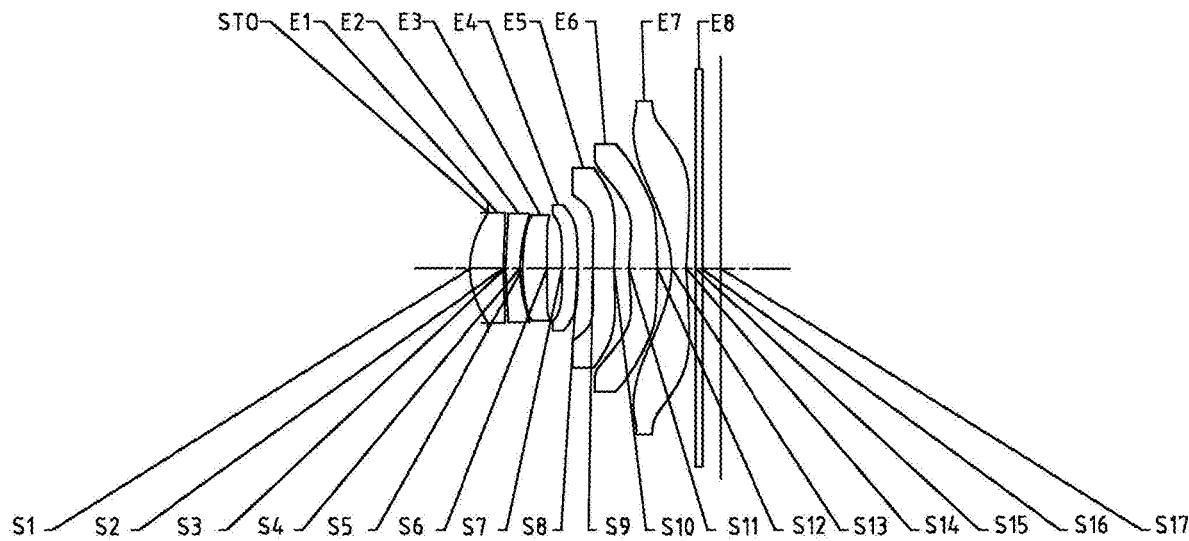
FIG. 15 is a schematic structural view of an optical imaging lens group according to example 8 of the present disclosure.

An optical imaging lens group according to example 8 of the present disclosure is described below with reference to FIG. 15 to FIG. 16D. FIG. 15 shows a schematic structural view of the optical imaging lens group according to example 8 of the present disclosure.

As shown in FIG. 15, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 22 shows surface type, radius of curvature, thickness, material and conic coefficient of each lens of the optical imaging lens group in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imagine plane S17, and half of a maximal field-of-view angle Semi-FOV in example 8.

TABLE 22

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2839 | | | |
| S1 | Aspheric | 1.3938 | 0.5278 | 1.55 | 56.1 | 0.0000 |
| S2 | Aspheric | 3.8295 | 0.0364 | | | 0.0000 |
| S3 | Aspheric | 3.4799 | 0.2300 | 1.67 | 20.4 | 0.0000 |
| S4 | Aspheric | 2.1805 | 0.0409 | | | 0.0000 |
| S5 | Aspheric | 3.9700 | 0.3891 | 1.55 | 56.1 | 0.0000 |
| S6 | Aspheric | −107.8704 | 0.2379 | | | 0.0000 |
| S7 | Aspheric | −131.3844 | 0.2464 | 1.65 | 23.5 | 0.0000 |
| S8 | Aspheric | 5172.6827 | 0.2408 | | | 99.0000 |
| S9 | Aspheric | 8.4317 | 0.3382 | 1.64 | 24 | 99.0000 |
| S10 | Aspheric | 6.3524 | 0.2388 | | | 3.2889 |
| S11 | Aspheric | 3.6490 | 0.4503 | 1.55 | 56.1 | −27.3289 |
| S12 | Aspheric | −3.6987 | 0.2239 | | | −69.4719 |
| S13 | Aspheric | −1.5270 | 0.2300 | 1.55 | 56.1 | 0.6384 |
| S14 | Aspheric | 2.4536 | 0.1497 | | | −1.3653 |
| S15 | Spherical | Infinite | 0.1100 | 1.52 | 64.2 | −61.8113 |
| S16 | Spherical | Infinite | 0.2902 | | | |
| S17 | Spherical | Infinite | | | | |

TABLE 23

| Surface number | A4 | A6 | A8 | A10 | A12 |
|---|---|---|---|---|---|
| S1 | −1.2854E−02 | −3.5877E−02 | 1.0713E−01 | −3.7137E−01 | 5.3562E−01 |
| S2 | −1.9974E−01 | 3.0979E−04 | 1.0593E+00 | −3.4527E+00 | 5.6978E+00 |

TABLE 23-continued

| | | | | | |
|---|---|---|---|---|---|
| S3 | −2.3472E−01 | −2.5368E−02 | 1.4138E+00 | −4.1039E+00 | 6.3483E+00 |
| S4 | −2.0067E−02 | −5.8147E−02 | −8.7452E−01 | 9.9444E+00 | −4.5276E+01 |
| S5 | 1.1119E−01 | 4.2941E−02 | −2.4955E+00 | 1.9042E+01 | −7.6477E+01 |
| S6 | 2.0075E−02 | −3.6355E−02 | 8.6640E−01 | −6.3775E+00 | 2.7692E+01 |
| S7 | −1.3949E−01 | 5.0594E−03 | −1.5406E+00 | 1.0142E+01 | −3.9335E+01 |
| S8 | −1.5332E−01 | 1.8878E−01 | −1.8694E+00 | 7.1871E+00 | −1.7416E+01 |
| S9 | −8.2440E−02 | −6.2740E−02 | 2.1675E−01 | −6.5349E−01 | 5.8385E−01 |
| S10 | −8.3481E−02 | −1.5518E−01 | 5.6247E−01 | −8.9692E−01 | 7.9639E−01 |
| S11 | 1.7252E−01 | −7.7356E−01 | 7.9835E−01 | −5.3950E−01 | 3.3606E−01 |
| S12 | 4.8688E−01 | −9.4193E−01 | 8.1985E−01 | −4.2577E−01 | 1.4741E−01 |
| S13 | 1.5436E−01 | −1.3150E−01 | 5.8590E−02 | −9.3063E−03 | −1.7313E−03 |
| S14 | −1.1497E−01 | 1.2998E−01 | −8.3908E−02 | 3.0115E−02 | −6.4906E−03 |

| Surface number | A14 | A16 | A18 | A20 |
|---|---|---|---|---|
| S1 | −3.7320E−01 | 1.6719E−02 | 5.7825E−02 | 0.0000E+00 |
| S2 | −5.1054E+00 | 1.9167E+00 | 0.0000E+00 | 0.0000E+00 |
| S3 | −5.4429E+00 | 1.9893E+00 | 0.0000E+00 | 0.0000E+00 |
| S4 | 1.0757E+02 | −1.3791E+02 | 8.9425E+01 | −2.2772E+01 |
| S5 | 1.7495E+02 | −2.2405E+02 | 1.4949E+02 | −4.0458E+01 |
| S6 | −7.0742E+01 | 1.0693E+02 | −8.7789E+01 | 3.0587E+01 |
| S7 | 9.1617E+01 | −1.2816E+02 | 9.8523E+01 | −3.1914E+01 |
| S8 | 2.6369E+01 | −2.4282E+01 | 1.2365E+01 | −2.6174E+00 |
| S9 | 1.2665E−01 | −7.6012E−01 | 5.9812E−01 | −1.4806E−01 |
| S10 | −4.2559E−01 | 1.3753E−01 | −2.4850E−02 | 1.9262E−03 |
| S11 | −1.7621E−01 | 6.0029E−02 | −1.1035E−02 | 8.2602E−04 |
| S12 | −3.5912E−02 | 6.1834E−03 | −6.9230E−04 | 3.7581E−05 |
| S13 | 1.0069E−03 | −1.8021E−04 | 1.5123E−05 | −5.0398E−07 |
| S14 | 8.3936E−04 | −6.0279E−05 | 1.9506E−06 | −1.1806E−08 |

TABLE 24

| | |
|---|---|
| f1(mm) | 3.73 |
| f2(mm) | −9.43 |
| f3(mm) | 7.02 |
| f4(mm) | −198.78 |
| f5(mm) | −42.96 |
| f6(mm) | 3.44 |
| f7(mm) | −1.69 |
| f(mm) | 3.48 |
| TTL(mm) | 3.98 |
| ImgH(mm) | 3.35 |
| Semi-FOV(°) | 41.1 |

Figure 16A:
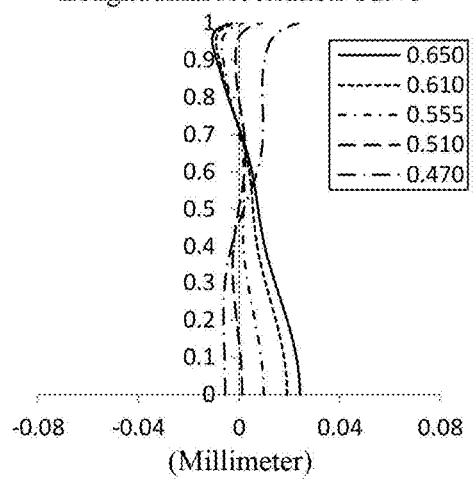
FIGS. 16A-16D illustrate a longitudinal aberration curve, an astigmatic curve, a distortion curve and a lateral color curve of the optical imaging lens group according to example 8, respectively.
Figure 16B:
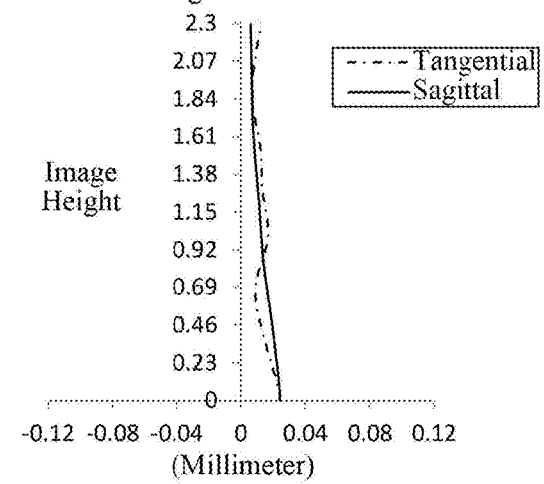
Figure 16C:
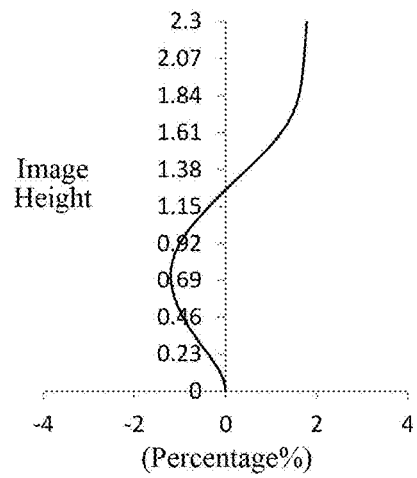
Figure 16D:
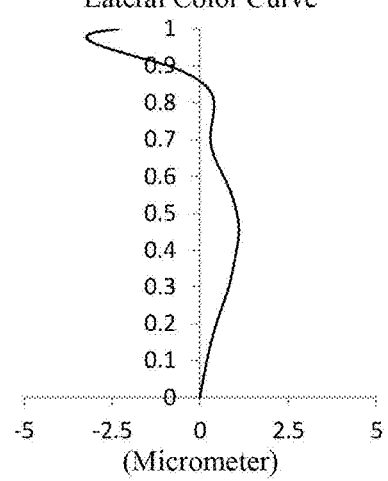

FIG. 16A illustrates a longitudinal aberration curve of the optical imaging lens group according to example 8, representing deviations of focal points focused by light of different wavelengths after passing through the optical imaging lens group. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion corresponding to different image heights. FIG. 16D illustrates a lateral color curve of the optical imaging lens group according to example 8, representing deviations of different image heights on an imaging plane after the light passes through the optical imaging lens group. It can be seen from FIG. 16A to FIG. 16D that the optical imaging lens group provided in example 8 can achieve good image quality.

Example 9

Figure 17:
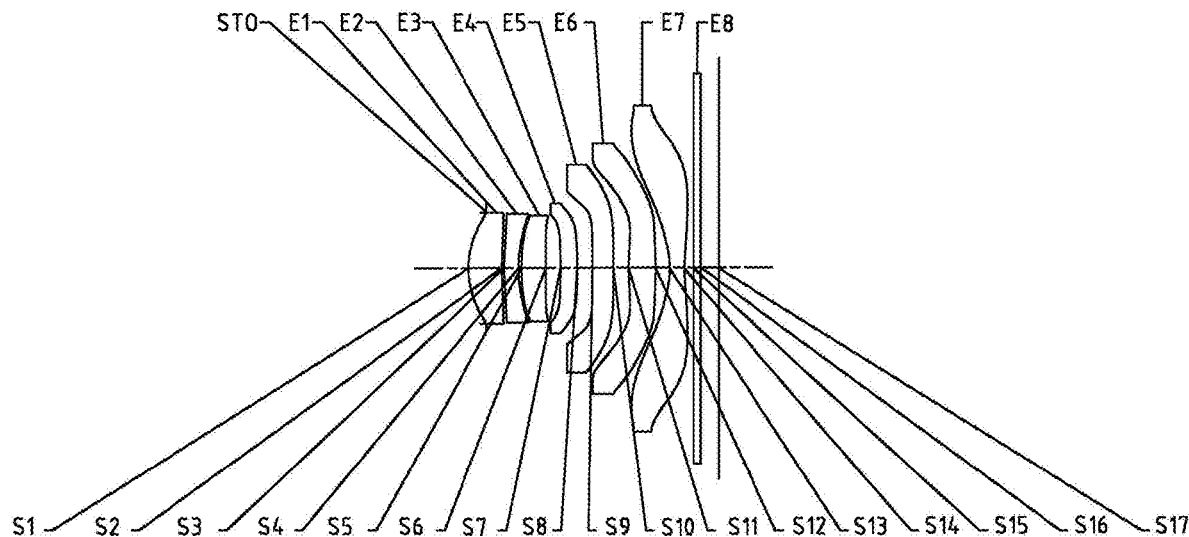
FIG. 17 is a schematic structural view of an optical imaging lens group according to example 9 of the present disclosure.

An optical imaging lens group according to example 9 of the present disclosure is described below with reference to FIG. 17 to FIG. 18D. FIG. 17 shows a schematic structural view of the optical imaging lens group according to example 9 of the present disclosure.

As shown in FIG. 17, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a flat in the paraxial region. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 25 shows surface type, radius of curvature, thickness, material and conic coefficient of each lens of the optical imaging lens group in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 9.

TABLE 25

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.2855 | | | |
| S1 | Aspheric | 1.3941 | 0.5288 | 1.55 | 56.1 | 0.0000 |
| S2 | Aspheric | 3.8605 | 0.0379 | | | 0.0000 |
| S3 | Aspheric | 3.4039 | 0.2300 | 1.67 | 20.4 | 0.0000 |
| S4 | Aspheric | 2.1552 | 0.0466 | | | 0.0000 |
| S5 | Aspheric | 3.8948 | 0.3876 | 1.55 | 56.1 | 0.0000 |
| S6 | Aspheric | −400.0043 | 0.2358 | | | 0.0000 |
| S7 | Aspheric | −44.0060 | 0.2606 | 1.65 | 23.5 | 99.0000 |
| S8 | Aspheric | −55.2813 | 0.2433 | | | 99.0000 |
| S9 | Aspheric | 30.1908 | 0.3330 | 1.64 | 24 | 86.8988 |
| S10 | Aspheric | Infinite | 0.2402 | | | 99.0000 |
| S11 | Aspheric | 5.2766 | 0.4303 | 1.55 | 56.1 | −75.6191 |
| S12 | Aspheric | −3.6986 | 0.2229 | | | 0.6194 |
| S13 | Aspheric | −1.5360 | 0.2300 | 1.55 | 56.1 | −1.3528 |
| S14 | Aspheric | 2.3760 | 0.1508 | | | −60.9765 |
| S15 | Spherical | Infinite | 0.1100 | 1.52 | 64.2 | |
| S16 | Spherical | Infinite | 0.2921 | | | |
| S17 | Spherical | Infinite | | | | |

TABLE 26

| Surface number | A4 | A6 | A8 | A10 | A12 |
|---|---|---|---|---|---|
| S1 | −1.3639E−02 | −2.4503E−02 | 5.9473E−02 | −2.5106E−01 | 3.8272E−01 |
| S2 | −2.1207E−01 | 2.1320E−02 | 1.2109E+00 | −4.1622E+00 | 7.1179E+00 |
| S3 | −2.5139E−01 | 1.1341E−02 | 1.5210E+00 | −4.7251E+00 | 7.5896E+00 |
| S4 | −2.5864E−02 | −1.8416E−01 | 6.1443E−01 | 1.5403E+00 | −1.6163E+01 |
| S5 | 1.0642E−01 | −4.7065E−02 | −1.5413E+00 | 1.3434E+01 | −5.5493E+01 |
| S6 | 2.7165E−02 | −1.6028E−01 | 1.9462E+00 | −1.2145E+01 | 4.6134E+01 |
| S7 | −1.5936E−01 | 1.9983E−01 | −3.1177E+00 | 1.8456E+01 | −6.7080E+01 |
| S8 | −1.7399E−01 | 3.8345E−01 | −3.1758E+00 | 1.2594E+01 | −3.1365E+01 |
| S9 | −3.7497E−02 | −1.0348E−01 | 2.1959E−02 | 2.7255E−01 | −1.3650E+00 |
| S10 | 1.0668E−02 | −3.8845E−01 | 9.5947E−01 | −1.3289E+00 | 1.0944E+00 |
| S11 | 1.5675E−01 | −7.6708E−01 | 6.8799E−01 | −2.3741E−01 | 3.2012E−03 |
| S12 | 5.3415E−01 | −1.1099E+00 | 1.0672E+00 | −6.2338E−01 | 2.4239E−01 |
| S13 | 1.5512E−01 | −1.3405E−01 | 6.1728E−02 | −1.1243E−02 | −1.0615E−03 |
| S14 | −1.1719E−01 | 1.4286E−01 | −1.0046E−01 | 4.0693E−02 | −1.0284E−02 |

| Surface number | A14 | A16 | A18 | A20 |
|---|---|---|---|---|
| S1 | −2.7895E−01 | 6.9361E−03 | 4.7453E−02 | 0.0000E+00 |
| S2 | −6.5582E+00 | 2.5255E+00 | 0.0000E+00 | 0.0000E+00 |
| S3 | −6.7002E+00 | 2.5211E+00 | 0.0000E+00 | 0.0000E+00 |
| S4 | 4.5276E+01 | −5.8865E+01 | 3.5169E+01 | −7.2745E+00 |
| S5 | 1.2705E+02 | −1.6063E+02 | 1.0503E+02 | −2.7738E+01 |
| S6 | −1.0666E+02 | 1.4823E+02 | −1.1319E+02 | 3.6919E+01 |
| S7 | 1.4933E+02 | −2.0070E+02 | 1.4869E+02 | −4.6437E+01 |
| S8 | 4.8702E+01 | −1.5872E+01 | 2.3894E+01 | −5.2218E+00 |
| S9 | 2.4885E+00 | −2.5102E+00 | 1.3474E+00 | −2.8839E−01 |
| S10 | −5.5564E−01 | 1.7292E−01 | −3.0457E−02 | 2.3282E−03 |
| S11 | 1.5854E−02 | −1.5835E−03 | −5.9427E−04 | 9.5428E−05 |
| S12 | −6.4330E−02 | 1.1380E−02 | −1.2247E−03 | 6.0994E−05 |
| S13 | 8.7212E−04 | −1.6465E−04 | 1.4177E−05 | −4.8089E−07 |
| S14 | 1.6436E−03 | −1.6078E−04 | 8.8032E−06 | −2.0842E−07 |

TABLE 27

| f1(mm) | 3.72 |
|---|---|
| f2(mm) | −9.52 |

TABLE 27-continued

| f3(mm) | 7.07 |
|---|---|
| f4(mm) | −337.78 |

TABLE 27-continued

| | |
|---|---|
| f5(mm) | 47.15 |
| f6(mm) | 4.05 |
| f7(mm) | −1.67 |
| f(mm) | 3.48 |
| TTL(mm) | 3.98 |
| ImgH(mm) | 3.35 |
| Semi-FOV(°) | 39.5 |

Figure 18A:
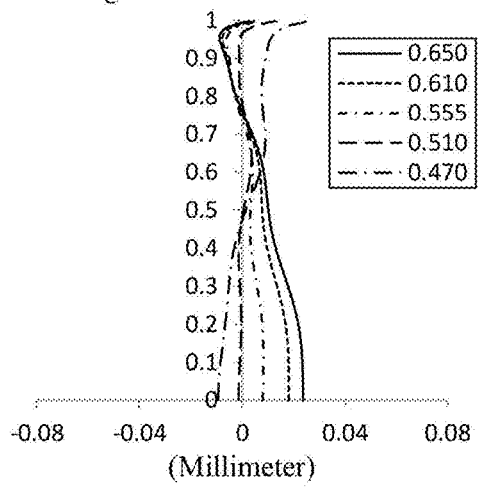
FIGS. 18A-18D illustrate a longitudinal aberration curve, an astigmatic curve, a distortion curve and a lateral color curve of the optical imaging lens group according to example 9, respectively.
Figure 18B:
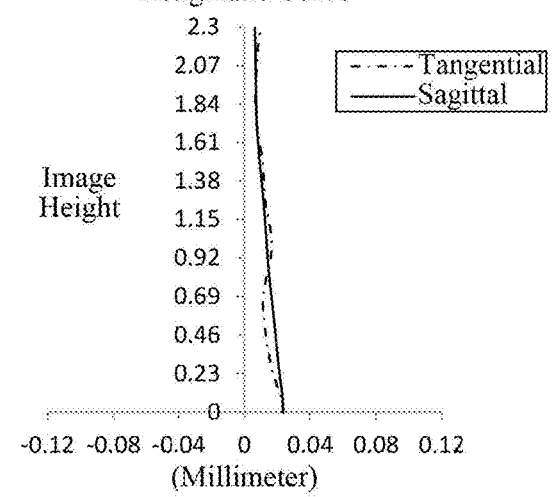
Figure 18C:
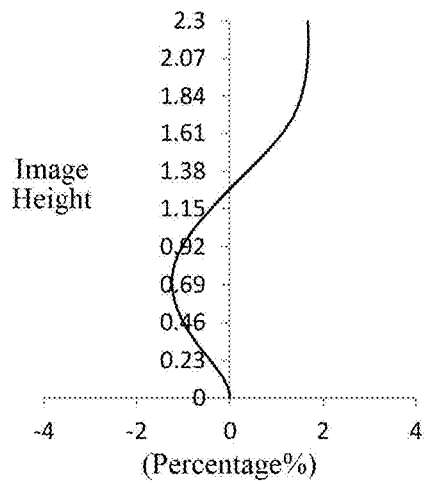
Figure 18D:
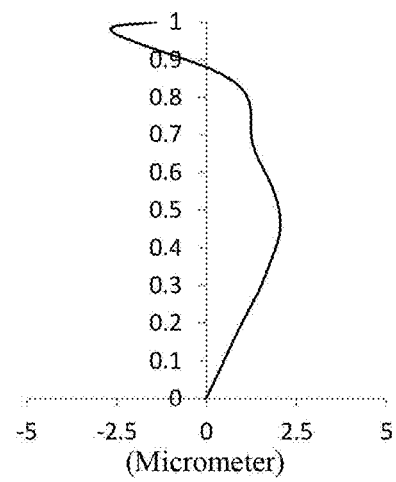

FIG. 18A illustrates a longitudinal aberration curve of the optical imaging lens group according to example 9, representing deviations of focal points focused by light of different wavelengths after passing through the optical imaging lens group. FIG. 18B illustrates an astigmatic curve of the optical imaging lens group according to example 9, representing a curvature of a tangential plane and a curvature of a sagittal plane. FIG. 18C illustrates a distortion curve of the optical imaging lens group according to example 9, representing amounts of distortion corresponding to different image heights. FIG. 18D illustrates a lateral color curve of the optical imaging lens group according to example 9, representing deviations of different image heights on an imaging plane after the light passes through the optical imaging lens group. It can be seen from FIG. 18A to FIG. 18D that the optical imaging lens group provided in example 9 can achieve good image quality.

Example 10

Figure 19:
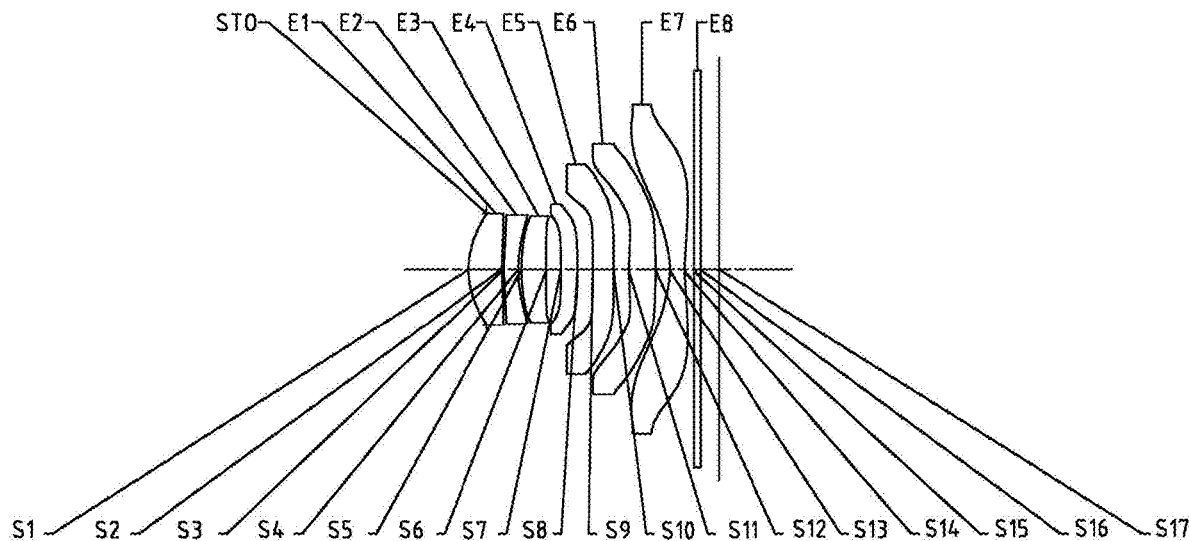
FIG. 19 is a schematic structural view of an optical imaging lens group according to example 10 of the present disclosure.

An optical imaging lens group according to example 10 of the present disclosure is described below with reference to FIG. 19 to FIG. 20D. FIG. 19 shows a schematic structural view of the optical imaging lens group according to example 10 of the present disclosure.

As shown in FIG. 19, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 28 shows surface type, radius of curvature, thickness, material and conic coefficient of each lens of the optical imaging lens group in example 10, wherein the units for the radius of curvature and the thickness are millimeter (mm). Table 29 shows high-order coefficients applicable to each aspheric surface in example 10, wherein the surface shape of each aspheric surface may be defined by the formula (1) given in the above example 1. Table 30 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 10.

TABLE 28

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.2854 | | | |
| S1 | Aspheric | 1.3945 | 0.5270 | 1.55 | 56.1 | 0.0000 |
| S2 | Aspheric | 3.7831 | 0.0347 | | | 0.0000 |
| S3 | Aspheric | 3.4924 | 0.2300 | 1.67 | 20.4 | 0.0000 |
| S4 | Aspheric | 2.2026 | 0.0504 | | | 0.0000 |
| S5 | Aspheric | 3.7756 | 0.3898 | 1.55 | 56.1 | 0.0000 |
| S6 | Aspheric | −2292.8150 | 0.2381 | | | 0.0000 |
| S7 | Aspheric | −47.3781 | 0.2599 | 1.65 | 23.5 | 99.0000 |
| S8 | Aspheric | −55.1766 | 0.2430 | | | 99.0000 |
| S9 | Aspheric | 32.9578 | 0.3326 | 1.64 | 24 | 65.3257 |
| S10 | Aspheric | −1733.0633 | 0.2388 | | | 99.0000 |
| S11 | Aspheric | 5.3303 | 0.4288 | 1.55 | 56.1 | −75.0217 |
| S12 | Aspheric | −3.7009 | 0.2237 | | | 0.6112 |
| S13 | Aspheric | −1.5350 | 0.2300 | 1.55 | 56.1 | −1.3502 |
| S14 | Aspheric | 2.3515 | 0.1511 | | | −61.5281 |
| S15 | Spherical | Infinite | 0.1100 | 1.52 | 64.2 | |
| S16 | Spherical | Infinite | 0.2920 | | | |
| S17 | Spherical | Infinite | | | | |

TABLE 29

| Surface number | A4 | A6 | A8 | A10 | A12 |
|---|---|---|---|---|---|
| S1 | −1.4358E−02 | −2.0367E−02 | 3.9824E−02 | −1.9073E−01 | 2.8274E−01 |
| S2 | −2.1520E−01 | 5.6156E−02 | 1.0342E+00 | −3.7486E+00 | 6.6111E+00 |
| S3 | −2.4957E−01 | 6.1495E−02 | 1.2599E+00 | −4.1756E+00 | 7.0124E+00 |
| S4 | −3.5774E−02 | −6.6052E−02 | 2.3828E−02 | 2.9253E+00 | −1.7006E+01 |
| S5 | 9.0165E−02 | 1.2458E−03 | −1.2822E+00 | 9.7644E+00 | −3.7944E+01 |
| S6 | 1.3868E−02 | 1.1065E−02 | 5.0447E−01 | −4.5019E+00 | 2.0617E+01 |
| S7 | −1.6066E−01 | 1.7391E−01 | −2.7120E+00 | 1.5616E+01 | −5.5741E+01 |
| S8 | −1.7032E−01 | 3.5488E−01 | −3.0668E+00 | 1.2390E+01 | −3.1249E+01 |
| S9 | −4.4918E−02 | −3.3806E−02 | −3.1222E−01 | 1.1679E+00 | −2.8248E+00 |
| S10 | 1.7570E−02 | −4.1000E−01 | 9.9087E−01 | −1.3519E+00 | 1.1023E+00 |
| S11 | 1.6187E−01 | −7.8825E−01 | 7.2290E−01 | −2.6857E−01 | 2.0384E−02 |
| S12 | 5.4041E−01 | −1.1370E+00 | 1.1153E+00 | −6.7032E−01 | 2.7011E−01 |
| S13 | 1.5512E−01 | −1.3542E−01 | 6.3994E−02 | −1.2924E−02 | −3.7928E−04 |
| S14 | −1.1733E−01 | 1.4425E−01 | −1.0247E−01 | 4.1973E−02 | −1.0719E−02 |

| Surface number | A14 | A16 | A18 | A20 |
|---|---|---|---|---|
| S1 | −2.0437E−01 | −2.5765E−04 | 3.5960E−02 | 0.0000E+00 |
| S2 | −6.2365E+00 | 2.4424E+00 | 0.0000E+00 | 0.0000E+00 |
| S3 | −6.3933E+00 | 2.4495E+00 | 0.0000E+00 | 0.0000E+00 |
| S4 | 4.2309E+01 | −5.1623E+01 | 2.8679E+01 | −5.0988E+00 |
| S5 | 8.3080E+01 | −9.9276E+01 | 5.9790E+01 | −1.3963E+01 |
| S6 | −5.2967E+01 | 7.9102E+01 | −6.3453E+01 | 2.1597E+01 |
| S7 | 1.2218E+02 | −1.6217E+02 | 1.1875E+02 | −3.6599E+01 |
| S8 | 4.8947E+01 | −4.6404E+01 | 2.4289E+01 | −5.3272E+00 |
| S9 | 3.9816E+00 | −3.4542E+00 | 1.6853E+00 | −3.4048E−01 |
| S10 | −5.5591E−01 | 1.7215E−01 | −3.0202E−02 | 2.3006E−03 |
| S11 | 9.6763E−03 | −1.5629E−04 | −7.8640E−04 | 1.0680E−04 |
| S12 | −7.4511E−02 | 1.3659E−02 | −1.5093E−03 | 7.6207E−05 |
| S13 | 7.1042E−04 | −1.4225E−04 | 1.2491E−05 | −4.2754E−07 |
| S14 | 1.7275E−03 | −1.6989E−04 | 9.3143E−06 | −2.1956E−07 |

TABLE 30

| | |
|---|---|
| f1(mm) | 3.75 |
| f2(mm) | −9.64 |
| f3(mm) | 6.90 |
| f4(mm) | −526.93 |
| f5(mm) | 50.52 |
| f6(mm) | 4.07 |
| f7(mm) | −1.67 |
| f(mm) | 3.48 |
| TTL(mm) | 3.98 |
| ImgH(mm) | 3.35 |
| Semi-FOV(°) | 41.3 |

Figure 20A:
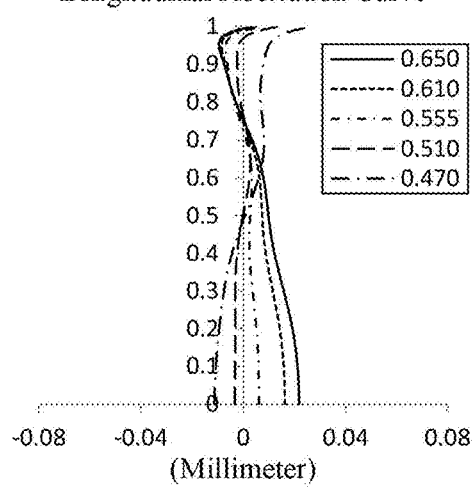
FIGS. 20A-20D illustrate a longitudinal aberration curve, an astigmatic curve, a distortion curve and a lateral color curve of the optical imaging lens group according to example 10, respectively.
Figure 20B:
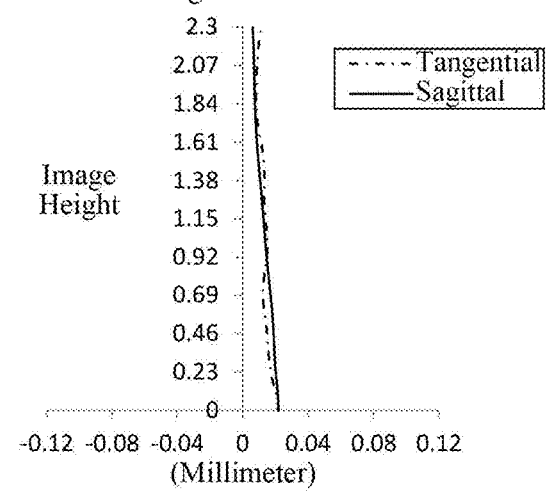
Figure 20C:
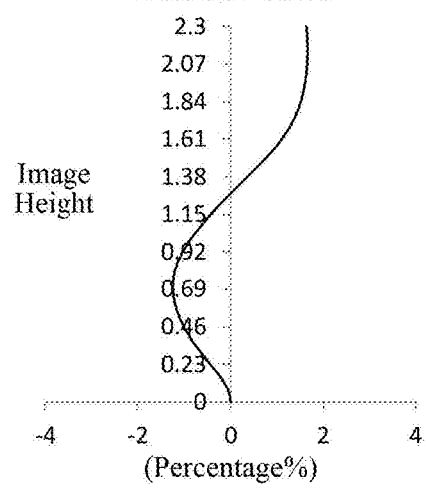
Figure 20D:
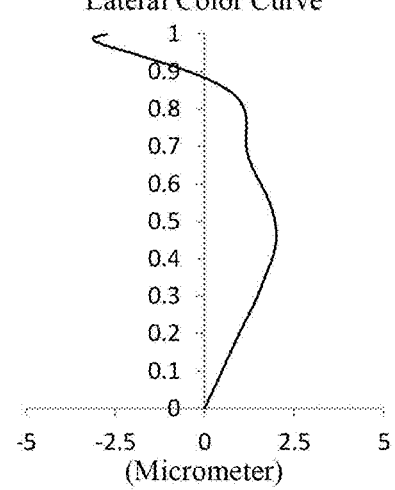

FIG. 20A illustrates a longitudinal aberration curve of the optical imaging lens group according to example 10, representing deviations of focal points focused by light of different wavelengths after passing through the optical imaging lens group. FIG. 20B illustrates an astigmatic curve of the optical imaging lens group according to example 10, representing a curvature of a tangential plane and a curvature of a sagittal plane. FIG. 20C illustrates a distortion curve of the optical imaging lens group according to example 10, representing amounts of distortion corresponding to different image heights. FIG. 20D illustrates a lateral color curve of the optical imaging lens group according to example 10, representing deviations of different image heights on an imaging plane after the light passes through the optical imaging lens group. It can be seen from FIG. 20A to FIG. 20D that the optical imaging lens group provided in example 10 can achieve good image quality.

Example 11

Figure 21:
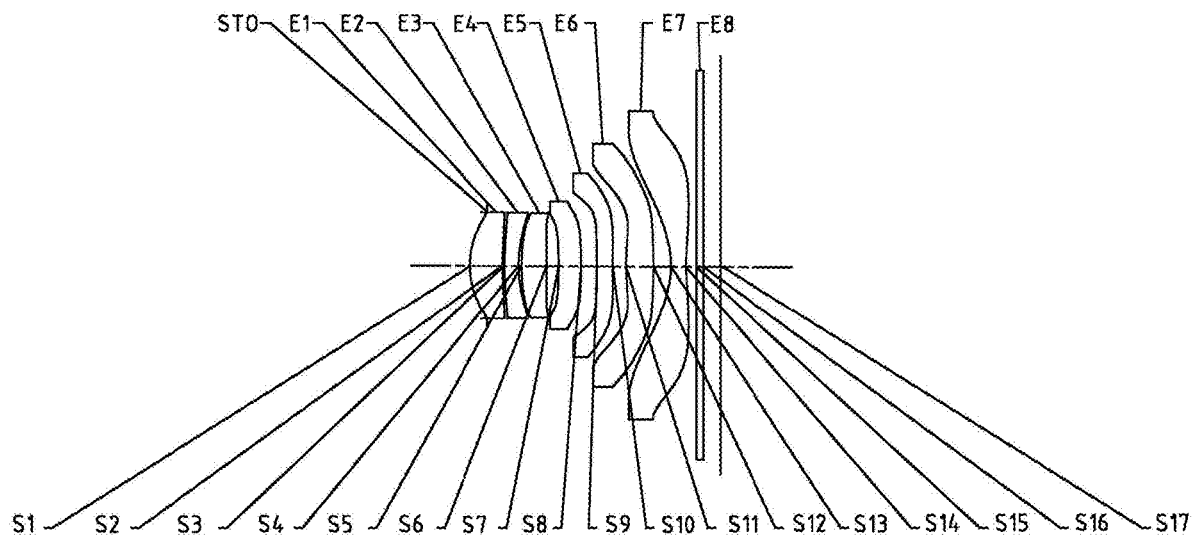
FIG. 21 is a schematic structural view of an optical imaging lens group according to example 11 of the present disclosure.

An optical imaging lens group according to example 11 of the present disclosure is described below with reference to FIG. 21 to FIG. 22D. FIG. 21 shows a schematic structural view of the optical imaging lens group according to example 11 of the present disclosure.

As shown in FIG. 21, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 31 shows surface type, radius of curvature, thickness, material and conic coefficient of each lens of the optical imaging lens group in example 11, wherein the units for the radius of curvature and the thickness are millimeter (mm). Table 32 shows high-order coefficients applicable to each aspheric surface in example 11, wherein the surface shape of each aspheric surface may be defined by the formula (1) given in the above example 1. Table 33 shows effective focal lengths f1 to f7 of respective lens, a total effective focal length f of the optical imaging lens group, a total track length TTL (i.e., a distance along the optical axis from the object-side surface S1 of the first lens E1 to the imaging plane S17), half of a diagonal length ImgH of an effective pixel area on the imaging plane S17, and half of a maximal field-of-view angle Semi-FOV in example 11.

TABLE 31

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2758 | | | |
| S1 | Aspheric | 1.3727 | 0.5162 | 1.55 | 56.1 | 0.0000 |
| S2 | Aspheric | 4.2108 | 0.0300 | | | 0.0000 |
| S3 | Aspheric | 3.6509 | 0.2300 | 1.67 | 20.4 | 0.0000 |
| S4 | Aspheric | 2.1899 | 0.0471 | | | 0.0000 |
| S5 | Aspheric | 4.2322 | 0.3967 | 1.55 | 56.1 | 0.0000 |
| S6 | Aspheric | −33.9752 | 0.1924 | | | 0.0000 |
| S7 | Aspheric | −11.6277 | 0.3545 | 1.62 | 25.9 | −12.3280 |
| S8 | Aspheric | −11.6408 | 0.2500 | | | −79.7907 |
| S9 | Aspheric | −60.8907 | 0.2517 | 1.64 | 24 | −99.0000 |
| S10 | Aspheric | 18.2506 | 0.2103 | | | −62.0522 |
| S11 | Aspheric | 3.7207 | 0.4397 | 1.55 | 56.1 | −98.2128 |
| S12 | Aspheric | −3.6784 | 0.2757 | | | 0.5777 |
| S13 | Aspheric | −1.4363 | 0.2332 | 1.55 | 56.1 | −1.3387 |
| S14 | Aspheric | 2.6587 | 0.1689 | | | −65.3888 |
| S15 | Spherical | Infinite | 0.1100 | 1.52 | 64.2 | |
| S16 | Spherical | Infinite | 0.2733 | | | |
| S17 | Spherical | Infinite | | | | |

TABLE 32

| Surface number | A4 | A6 | A8 | A10 | A12 |
|---|---|---|---|---|---|
| S1 | −1.0535E−02 | −4.4739E−02 | 1.7278E−01 | −5.9264E−01 | 9.4136E−01 |
| S2 | −2.2234E−01 | 5.7922E−01 | −1.1679E+00 | 1.2720E+00 | −4.5562E−01 |
| S3 | −2.6162E−01 | 6.3510E−01 | −1.1778E+00 | 1.1992E+00 | −2.2582E−01 |
| S4 | −8.7767E−02 | 3.9656E−01 | −1.2189E+00 | 2.1598E+00 | −1.4109E+00 |
| S5 | 5.0104E−02 | 4.9537E−02 | 1.1384E+00 | −8.4821E+00 | 3.1562E+01 |
| S6 | −1.2344E−02 | 2.5217E−01 | −2.1743E+00 | 1.2037E+01 | −3.8173E+01 |
| S7 | −1.4650E−01 | 1.8465E−01 | −4.2971E+00 | 2.9533E+01 | −1.1996E+02 |
| S8 | −9.4311E−02 | 5.2871E−02 | −1.2032E+00 | 4.2274E+00 | −9.0525E+00 |
| S9 | −5.8382E−03 | −2.5582E−01 | 1.0064E+00 | −3.0091E+00 | 4.6709E+00 |
| S10 | −9.7618E−02 | −1.8152E−01 | 7.9842E−01 | −1.5293E+00 | 1.5438E+00 |
| S11 | 1.9155E−01 | −9.1271E−01 | 1.1161E+00 | −8.9236E−01 | 5.4146E−01 |
| S12 | 4.5171E−01 | −8.4744E−01 | 6.8620E−01 | −2.8841E−01 | 5.3672E−02 |
| S13 | 1.8304E−01 | −2.0170E−01 | 1.2902E−01 | −4.7562E−02 | 1.0738E−02 |
| S14 | −7.7705E−02 | 4.9991E−02 | −9.4193E−03 | −1.0112E−02 | 7.2162E−03 |

| Surface number | A14 | A16 | A18 | A20 |
|---|---|---|---|---|
| S1 | −7.0275E−01 | 2.9086E−02 | 1.4086E−01 | 0.0000E+00 |
| S2 | −4.2061E−01 | 3.3088E−01 | 0.0000E+00 | 0.0000E+00 |
| S3 | −5.6071E−01 | 3.1947E−01 | 0.0000E+00 | 0.0000E+00 |
| S4 | −6.3547E+00 | 2.5378E+01 | −3.6578E+01 | 1.8411E+01 |
| S5 | −7.0953E+01 | 1.0275E+02 | −8.7530E+01 | 3.2384E+01 |
| S6 | 7.4245E+01 | −8.5703E+01 | 5.4437E+01 | −1.4319E+01 |
| S7 | 2.9847E+02 | −4.4786E+02 | 3.7159E+02 | −1.3082E+02 |
| S8 | 1.2505E+01 | −1.0850E+01 | 5.4168E+00 | −1.1703E+00 |
| S9 | −4.3155E+00 | 2.3017E+00 | −6.1576E−01 | 5.9489E−02 |
| S10 | −8.9793E−01 | 3.0718E−01 | −5.7961E−02 | 4.6733E−03 |
| S11 | −2.4085E−01 | 7.0992E−02 | −1.2015E−02 | 8.7014E−04 |
| S12 | 3.6721E−03 | −3.7287E−03 | 6.5824E−04 | −3.9652E−05 |
| S13 | −1.5283E−03 | 1.3841E−04 | −7.7375E−06 | 2.1508E−07 |
| S14 | −2.1314E−03 | 3.3333E−04 | −2.6873E−05 | 8.7625E−07 |

TABLE 33

| | |
|---|---|
| f1(mm) | 3.51 |
| f2(mm) | -8.76 |
| f3(mm) | 6.92 |
| f4(mm) | 1785.05 |
| f5(mm) | -21.91 |
| f6(mm) | 3.46 |
| f7(mm) | -1.67 |
| f(mm) | 3.50 |
| TTL(mm) | 3.98 |
| ImgH(mm) | 3.35 |
| Semi-FOV(°) | 45.0 |

Figure 22A:
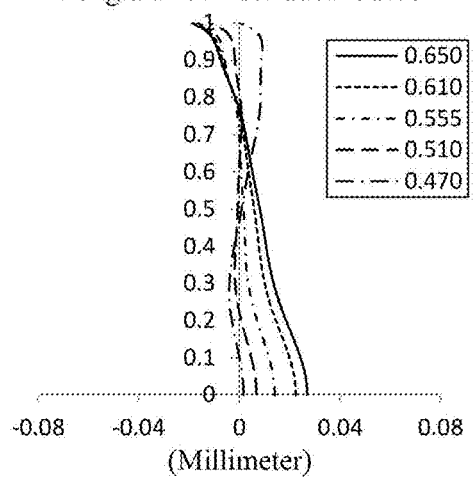
FIGS. 22A-22D illustrate a longitudinal aberration curve, an astigmatic curve, a distortion curve and a lateral color curve of the optical imaging lens group according to example 11, respectively.
Figure 22B:
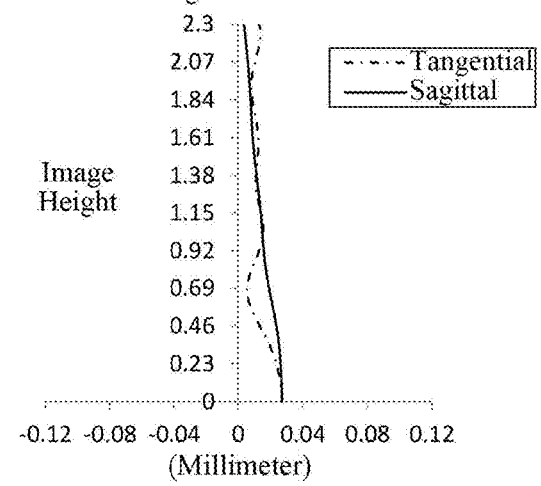
Figure 22C:
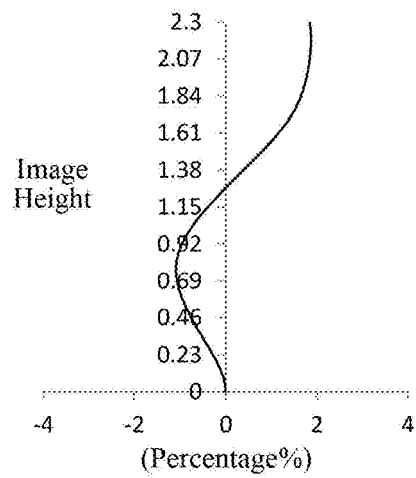
Figure 22D:
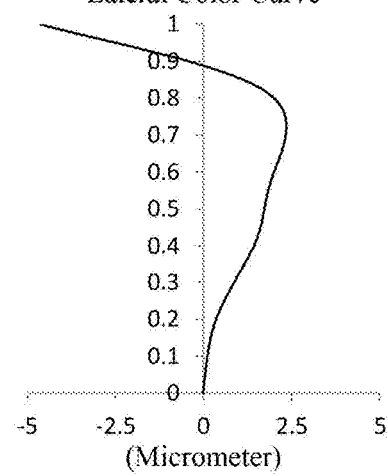

FIG. 22A illustrates a longitudinal aberration curve of the optical imaging lens group according to example 11, representing deviations of focal points focused by light of different wavelengths after passing through the optical imaging lens group. FIG. 22B illustrates an astigmatic curve of the optical imaging lens group according to example 11, representing a curvature of a tangential plane and a curvature of a sagittal plane. FIG. 22C illustrates a distortion curve of the optical imaging lens group according to example 11, representing amounts of distortion corresponding to different image heights. FIG. 22D illustrates a lateral color curve of the optical imaging lens group according to example 11, representing deviations of different image heights on an imaging plane after the light passes through the optical imaging lens group. It can be seen from FIG. 22A to FIG. 22D that the optical imaging lens group provided in example 11 can achieve good image quality.

In view of the above, examples 1 to 11 respectively satisfy the relationship shown in Table 34.

TABLE 34

| | Example | | | | | | | | | | |
|---|---|---|---|---|---|---|---|---|---|---|---|
| Condition | 1 | 2 | 3 | 4 | 5 | 6 | 7 | 8 | 9 | 10 | 11 |
| TTL/ImgH | 1.19 | 1.19 | 1.19 | 1.21 | 1.21 | 1.19 | 1.19 | 1.19 | 1.19 | 1.19 | 1.19 |
| (CT1 + CT2)/(T12 × 5) | 4.43 | 5.03 | 5.00 | 5.32 | 5.26 | 4.67 | 5.10 | 4.16 | 4.00 | 4.36 | 4.97 |
| ET5/CT5 | 1.13 | 1.10 | 1.01 | 0.84 | 1.00 | 1.19 | 1.03 | 1.00 | 0.94 | 1.00 | 0.93 |
| f345/f67 | -1.87 | -3.37 | -2.68 | -2.26 | -2.04 | -1.99 | -2.16 | -1.89 | -1.86 | -1.85 | -2.18 |
| SAG51/SAG41 | 2.34 | 2.53 | 2.30 | 2.52 | 2.54 | 2.38 | 2.15 | 2.14 | 2.51 | 2.20 | 2.77 |
| ET6/ET7 | 1.86 | 1.35 | 2.43 | 1.21 | 1.29 | 1.32 | 1.34 | 1.33 | 1.20 | 1.18 | 0.82 |
| (R1 + R2)/(R1 - R2) | -1.94 | -1.94 | -1.94 | -2.03 | -2.12 | -2.07 | -2.11 | -2.14 | -2.13 | -2.17 | -1.97 |
| R13/R14 | -0.49 | -0.67 | -0.69 | -0.63 | -0.63 | -0.62 | -0.64 | -0.62 | -0.65 | -0.65 | -0.54 |
| ΣAT/T67 | 4.73 | 4.06 | 4.81 | 4.59 | 4.50 | 4.46 | 4.59 | 4.55 | 4.61 | 4.60 | 3.65 |
| f/f1 - f/f2 | 1.46 | 1.31 | 1.32 | 1.31 | 1.26 | 1.32 | 1.27 | 1.30 | 1.30 | 1.29 | 1.40 |
| f/CT3 | 11.28 | 9.56 | 9.75 | 9.57 | 9.27 | 8.86 | 9.25 | 8.94 | 8.98 | 8.92 | 8.82 |
| f3/R3 | 2.84 | 2.17 | 2.20 | 2.03 | 2.02 | 1.99 | 2.09 | 2.02 | 2.08 | 1.98 | 1.90 |
| f/EPD | 2.05 | 2.05 | 2.05 | 2.05 | 2.05 | 2.05 | 2.05 | 2.05 | 2.05 | 2.05 | 2.05 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, comprising: a first lens, a second lens, a third lens, a fourth lens, a fifth lens, a sixth lens and a seventh lens, which are sequentially arranged from an object side to an image side of the optical imaging lens group along an optical axis, wherein, the first lens has positive refractive power, an object-side surface of the first lens is a convex surface, and an image-side surface of the first lens is a concave surface;

the second lens has negative refractive power, an object-side surface of the second lens is a convex surface, and an image-side surface of the second lens is a concave surface;

the third lens has positive refractive power;

the fourth lens has refractive power;

the fifth lens has refractive power;

the sixth lens has positive refractive power;

the seventh lens has negative refractive power, and an object-side surface of the seventh lens is a concave surface;

wherein TTL/ImgH<1.3, where TTL is a distance along the optical axis from the object-side surface of the first lens to an imaging plane of the optical imaging lens group, and ImgH is half of a diagonal length of an effective pixel area on the imaging plane of the optical imaging lens group, and 4<(CT1+CT2)/(T12×5)<5.5, where CT1 is a center thickness of the first lens along the optical axis, CT2 is a center thickness of the second lens along the optical axis, and T12 is a spaced interval between the first lens and the second lens along the optical axis.

2. The optical imaging lens group as claimed in claim 1, wherein -2.5<(R1+R2)/(R1-R2)<-1.5, where R1 is a radius of curvature of the object-side surface of the first lens, and R2 is a radius of curvature of the image-side surface of the first lens.

3. The optical imaging lens group as claimed in claim 1, wherein 1.0<f/f1-f/f2<1.5, where f is a total effective focal length of the optical imaging lens group, f1 is an effective focal length of the first lens, and f2 is an effective focal length of the second lens.

4. The optical imaging lens group as claimed in claim 1, wherein 0.5<ET5/CT5≤1.5, where ET5 is an edge thickness of the fifth lens, and CT5 is a center thickness of the fifth lens along the optical axis.

5. The optical imaging lens group as claimed in claim 1, wherein 2<SAG51/SAG41≤3, where SAG51 is a distance along the optical axis from an intersection of an object-side surface of the fifth lens and the optical axis to a vertex of an effective radius of the object-side surface of the fifth lens, and SAG41 is a distance along the optical axis from an intersection of an object-side surface of the fourth lens and the optical axis to a vertex of an effective radius of the object-side surface of the fourth lens.

6. The optical imaging lens group as claimed in claim 1, wherein 0.5<ET6/ET7<2.5, where ET6 is an edge thickness of the sixth lens, and ET7 is an edge thickness of the seventh lens.

7. The optical imaging lens group as claimed in claim 1, wherein −0.1<R13/R14≤−0.5, where R13 is a radius of curvature of the object-side surface of the seventh lens, and R14 is a radius of curvature of an image-side surface of the seventh lens.

8. The optical imaging lens group as claimed in claim 1, wherein 8.0<f/CT3<12, where f is a total effective focal length of the optical imaging lens group, and CT3 is a center thickness of the third lens along the optical axis.

9. The optical imaging lens group as claimed in claim 1, wherein 1<f3/R3<3, where f3 is an effective focal length of the third lens, and R3 is a radius of curvature of the object-side surface of the second lens.

10. The optical imaging lens group as claimed in claim 1, wherein 3.5<ΣAT/T67<5, where ΣAT is a sum of spaced interval along the optical axis between each two adjacent lenses among the first lens to the seventh lens, and T67 is a spaced interval between the sixth lens and the seventh lens along the optical axis.

11. The optical imaging lens group as claimed in claim 1, wherein f/EPD<2.1, where f is a total effective focal length of the optical imaging lens group, and EPD is an entrance pupil diameter of the optical imaging lens group.

12. The optical imaging lens group as claimed in claim 1, wherein −3.5<f345/f67<−1.5, where f345 is a combined focal length of the third lens, the fourth lens, and the fifth lens, and f67 is a combined focal length of the sixth lens and the seventh lens.

13. The optical imaging lens group as claimed in claim 12, wherein −2.5<(R1+R2)/(R1-R2)<−1.5, where R1 is a radius of curvature of the object-side surface of the first lens, and R2 is a radius of curvature of the image-side surface of the first lens.

14. The optical imaging lens group as claimed in claim 12, wherein 1.0<f/f1-f/f2<1.5, where f is a total effective focal length of the optical imaging lens group, f1 is an effective focal length of the first lens, and f2 is an effective focal length of the second lens.

15. The optical imaging lens group as claimed in claim 14, wherein 4≤(CT1+CT2)/(T12×5)<5.5, where CT1 is a center thickness of the first lens along the optical axis, CT2 is a center thickness of the second lens along the optical axis, and T12 is a spaced interval between the first lens and the second lens along the optical axis.

16. The optical imaging lens group as claimed in claim 12, wherein 0.5<ET5/CT5≤1.5, where ET5 is an edge thickness of the fifth lens, and CT5 is a center thickness of the fifth lens along the optical axis.

17. The optical imaging lens group as claimed in claim 12, wherein 2<SAG51/SAG41≤3, where SAG51 is a distance along the optical axis from an intersection of an object-side surface of the fifth lens and the optical axis to a vertex of an effective radius of the object-side surface of the fifth lens, and SAG41 is a distance along the optical axis from an intersection of an object-side surface of the fourth lens and the optical axis to a vertex of an effective radius of the object-side surface of the fourth lens.

18. The optical imaging lens group as claimed in claim 12, wherein 0.5<ET6/ET7<2.5, where ET6 is an edge thickness of the sixth lens, and ET7 is an edge thickness of the seventh lens.

19. The optical imaging lens group as claimed in claim 12, wherein 3.5<ΣAT/T67<5, where ΣAT is a sum of spaced interval along the optical axis between each two adjacent lenses among the first lens to the seventh lens, and T67 is a spaced interval between the sixth lens and the seventh lens along the optical axis.

* * * * *